(12) United States Patent
Lu et al.

(10) Patent No.: US 10,334,441 B2
(45) Date of Patent: Jun. 25, 2019

(54) WORKING METHOD OF NFC TOKEN

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 303 days.

(21) Appl. No.: 15/122,440

(22) PCT Filed: Mar. 16, 2015

(86) PCT No.: PCT/CN2015/074291
§ 371 (c)(1),
(2) Date: Aug. 30, 2016

(87) PCT Pub. No.: WO2015/139589
PCT Pub. Date: Sep. 24, 2015

(65) Prior Publication Data
US 2017/0070887 A1 Mar. 9, 2017

(30) Foreign Application Priority Data
Mar. 18, 2014 (CN) .......................... 2014 1 0101322

(51) Int. Cl.
*H04L 29/06* (2006.01)
*H04W 12/08* (2009.01)
(Continued)

(52) U.S. Cl.
CPC ........... *H04W 12/08* (2013.01); *H04L 9/3228* (2013.01); *H04L 63/0838* (2013.01);
(Continued)

(58) Field of Classification Search
None
See application file for complete search history.

(56) References Cited

U.S. PATENT DOCUMENTS 8,739,263 B2 5/2014 Azuma
2006/0097984 A1* 5/2006 Kim ...................... G06F 3/0202
345/156
(Continued)

*Primary Examiner* — Farid Homayounmehr
*Assistant Examiner* — Olanrewaju J. Bucknor
(74) *Attorney, Agent, or Firm* — Hammer & Associates, P.C.

(57) ABSTRACT

A working method of an NFC token. The method comprises: a micro control unit in a token performing system initialization; resetting a near field communication chip in the token and sending a near field communication chip setting instruction to the near field communication chip; waiting to receive a near field communication chip setting instruction return value; upon receiving the near field communication chip setting instruction return value, sending a first preset instruction to the near field communication chip; waiting to receive a first preset instruction return value; and upon receiving the first preset instruction return value, sending a second preset instruction comprising a dynamic password to the near field communication chip. The present invention has the beneficial effects that: the token is well compatible with a mobile platform, and is convenient to use, thereby simplifying the operation procedure of a user.

20 Claims, 7 Drawing Sheets

(51) Int. Cl.
   *H04W 4/80*   (2018.01)
   *H04L 9/32*   (2006.01)
   *H04W 12/04*  (2009.01)
(52) U.S. Cl.
   CPC ........... *H04L 63/0846* (2013.01); *H04W 4/80*
          (2018.02); *H04W 12/04* (2013.01); *H04L 2209/805* (2013.01)

(56) References Cited

U.S. PATENT DOCUMENTS

| | | | | |
|---|---|---|---|---|
| 2008/0126260 A1* | 5/2008 | Cox | ........................ | G06Q 20/20 705/67 |
| 2008/0155257 A1* | 6/2008 | Werner | .................. | H04L 9/0844 713/168 |
| 2012/0238207 A1* | 9/2012 | Marcovecchio | ...... | H04W 12/12 455/41.1 |
| 2014/0024412 A1* | 1/2014 | Jeon | ..................... | H04B 1/3816 455/558 |
| 2014/0074537 A1* | 3/2014 | Bargetzi | .................. | G08C 17/02 705/7.19 |
| 2014/0154978 A1* | 6/2014 | Garner | ................ | G06Q 20/3278 455/41.1 |
| 2014/0245428 A1* | 8/2014 | Li | ........................ | H04L 63/0853 726/16 |
| 2014/0329467 A1* | 11/2014 | Ewing | .................. | H04B 1/3827 455/41.2 |
| 2017/0156022 A1* | 6/2017 | Keller | .................. | H04B 5/0031 |

* cited by examiner

WORKING METHOD OF NFC TOKEN

FIELD OF THE INVENTION

The present invention relates to information security field, more particularly relates to a working method for NFC (Near Field Communication) token.

PRIOR ART

Due to rapid development of smart terminals, such as smart phone, in information security field, mobile bank, as a new service combining currency electronization and mobile communication, makes people deal with many financial businesses at any time and any places. In order to assure security of mobile bank business, respective banks begin to apply devices, such as challenge-response token, and earphone key, etc., in mobile banks. However, the earphone key has bad compatibility. Though the challenge-answer token has no problem of compatibility, the challenge-response token is not convenient for using because it requires more artificial intervention.

Near Field Communication (NFC), called near distance wireless communication, is a high frequency wireless communication technology with short distance, which allows data transmission between electronic devices in form of contactless point to point. Compared with other wireless communication technology, NFC has better security. Therefore, NFC is regarded as having better application prospect in fields, such as mobile phone payment.

SUMMARY OF THE INVENTION

The object of the present invention is to provide a working method for NFC token, which has a better compatibility for mobile platform, is convenient for using, and simplifies operating procedure of a user.

Therefore, the present invention provides a working method for an NFC token, which has implementing procedure as follows.

Step 1) performing, by a micro control unit of the token, system initializing;

Step 2) resetting, by the micro control unit, a near field communication chip of the token;

Step 3) sending, by the micro control unit, a setting near field communication chip instruction to the near field communication chip;

Step 4) waiting, by the micro control unit, for a return value of the setting near field communication chip instruction returned from the near field communication chip;

Step 5) sending, by the micro control unit, a first preset instruction to the near field communication chip when the micro control unit reads the return value of the setting near field communication chip instruction returned from the near field communication chip;

Step 6) waiting, by the micro control unit, for a return value of the first preset instruction returned from the near field communication chip; and Step 7) sending, by the micro control unit, a second preset instruction containing a dynamic password generated by the token when the micro control unit reads the first preset instruction value returned from the near field communication chip;

before sending a second preset instruction containing a dynamic password generated by the token, the method further comprising computing and generating, by the micro control unit, the dynamic password.

Preferably, Step S2 further comprises:

Step S2') waiting, by the micro control unit, for confirming start information input by a user; performing Step S3 when the confirming start information input by the user is received; otherwise, keep on waiting for the confirming start information input by the user;

in this case, Step S2' specifically comprises: checking, by the micro control unit, level of a key interrupting pin; when the level of the key interrupting pin is high level, representing that the confirming start information input by a user is received and performing Step S3; when the level of the key interrupting pin is low level, representing that the confirming start information input by a user is not received and keep on checking the level of the key interrupting pin; further, before sending, by the micro control unit, the first preset instruction to the near field communication chip and/or before sending, by the micro control unit, the second preset instruction containing the dynamic password generated by the token to the near field communication chip, the method further comprises: checking the level of the key interrupting pin; keep on performing procedure if the level is high level, going back to Step S2 if the level is low level, or Step S2' specifically comprises: starting, by the micro control unit, key interrupting, checking a start flag, performing Step S3 in the case that the start flag is set, which represents that the confirming start information input by the user is received; keep on checking the start flag in the case that the start flag is not set, which represents that the confirming start information input by the user is not received; correspondingly, Step S1 further comprises initializing, by the micro control unit, key interrupting, checking whether the start flag is set when the micro control unit receives the key interrupting; if yes, exit the key interrupting, otherwise, setting the start flag and exit the key interrupting; or Step S2' specifically comprises: starting, by the micro control unit, key interrupting, checking the start flag, performing Step S3 in the case that the start flag is set which represents that the confirming start information input by the user is received; keep on checking the start flag in the case that the start flag is not set which represents that the confirming start information input by the user is not received; correspondingly, Step S1 further comprises: initializing, by the micro control unit, key interrupting and setting the key interrupting as rising edge triggering; checking whether the start flag is set when the micro control unit receives the key interrupting, if yes, exiting key interrupting, otherwise setting the start flag and setting key interrupting as falling edge triggering, exiting key interrupting.

Preferably, Step S3 further comprises: setting, by the micro control unit, timeout limit of the near field communication chip;

in this case, setting, by the micro control unit, timeout limit of the near field communication chip specifically comprises: sending a setting timeout limit instruction to the near field communication chip, the setting timeout limit instruction contains power on response timeout limit and communication timeout limit.

Preferably, Step S3 specifically comprises: setting, by the micro control unit, a sequence number of the token, generating a configuring target device instruction upon the sequence number of the token, sending the configuring target device instruction to the near field communication chip; correspondingly, the first preset instruction is a receiving data instruction, the second preset instruction is a sending data instruction.

Preferably, Step S3 specifically comprises: setting, by the micro control unit, simulation card parameters, generating a configuring target device instruction upon the simulation card parameters, sending the configuring target device instruction to the near field communication chip, the simulation card parameters comprises simulation card type and simulation card ID; correspondingly, reading, by the micro control unit, the return value of the setting near field communication chip instruction returned from the near field communication chip, before sending the first preset instruction to the near field communication chip, the method further comprises: sending, by the micro control unit, the second preset instruction to the near field communication chip, when the micro control unit reads a second preset instruction return value returned from the near field communication chip, sending the first preset instruction to the near field communication chip; the first preset instruction is a obtaining data instruction, the second preset instruction is a sending data instruction.

Preferably, Step S3 specifically comprises: setting, by the micro control unit, card searching type and card searching rate; generating a configuring initiator instruction upon the card searching type and card searching rate, sending the configuring initiator instruction to the near field communication chip; correspondingly, the first preset instruction and the second preset instruction are both data exchanging instruction.

Step S4 to Step S7 specifically comprises:

Step A1) waiting, by the micro control unit, for receiving data interrupt, performing Step A2 when the micro control unit receives data interrupting;

Step A2) reading, by the micro control unit, return data of the near field communication chip, checking read data, sending the first preset instruction to the near field communication chip if the read data is the setting near field communication chip instruction and go back to Step A1; sending the second preset instruction containing the dynamic password generated by the token to the near field communication chip if the read data is the return value of the first preset instruction.

Correspondingly, Step S1 further comprises: initializing data interrupting;

preferably, Step S4 to S7 specifically comprises:

Step B1) checking, by the micro control unit, trigger flag, if the trigger flag is not set, waiting for data interrupting and going back to Step B1; if the trigger flag is set, performing Step B2;

when the micro control unit receives data interrupting, reading return data of the near field communication chip, checking the read data, if the read data is the return value of the near field communication chip, updating the work state of the token as a first preset state and setting the trigger flag; if the read data is the return value of the first preset instruction, updating the work state of the token to be a second preset state and setting the trigger flag;

Step B2) resetting, by the micro control unit, the trigger flag, checking the work state of the token, sending the first preset instruction to the near field communication chip if the work state is the first preset state and going back to Step B1; sending the second preset instruction containing the dynamic password generated by the token to the near field communication chip if the work state is the second preset state.

Correspondingly, Step S1 further comprises: initializing the data interrupt; Step S2 further comprises: initializing the work state of the token to be initial state.

Preferably, Step S4 to S7 specifically comprises:

Step C1) inquiring, by the micro control unit, level of the data interrupting pin, performing Step C2 if the level of the data interrupting pin is high level;

Step C2) reading, by the micro control unit, the return data of the near field communication chip, checking the read data, sending the first preset instruction to the near field communication chip if the read data is the return value of the near field communication chip instruction and going back to Step C1; sending the second preset instruction containing the dynamic password generated by the token to the near field communication chip if the read data is the return value of the first preset instruction;

Correspondingly, Step S1 further comprises: initializing data interrupting.

Preferably, before computing and generating the dynamic password, the method further comprises: prompting, by the micro control unit, the user to input confirming generating password information, determining whether the confirming generating password information input by the user is received in a first preset time, if yes, generating the dynamic password; otherwise, going back to Step S2, in this case, determining whether the confirming generating password information input by the user is received in the first preset time specifically comprises: checking, by the micro control unit, the level of the key interrupt pin, determining whether the level of the interrupt pin changes to be high level in the first preset time, if yes, the confirming generating password information input by the user is received in the first preset time; otherwise, the confirming generating password information input by the user is not received in the first preset time; or, determining whether the confirming generating password information input by the user is received in the first preset time specifically comprises: waiting, by the micro control unit, for receiving key interrupting and determining whether the key interrupting is received in the first preset time, if yes, the confirming generating password information input by the user is received in the first preset time; otherwise, the confirming generating dynamic password information input by the user is not received in the first preset time; correspondingly, Step S1 further comprises initializing key interrupting.

Preferably, in the case that the micro control unit reads the return value of the first preset instruction returned from the near field communication chip, before sending the second preset instruction containing the dynamic password generated by the token to the near field communication chip, the method further comprises: prompting, by the micro control unit, the user to input confirming sending password information and determining whether the confirming sending password information input by the user is received in a second preset time, if yes, sending the second preset instruction containing the dynamic password generated by the token to the near field communication chip; otherwise, going back to Step S2;

in this case, determining whether the confirming sending password information input by the user is received in a second preset time specifically comprises: checking, by the micro control unit, the level of the key interrupting pin, determining whether the level of the interrupt pin changes to be high level in the second preset time, if yes, the confirming generating dynamic password information input by the user is received in the second preset time; otherwise, the confirming generating dynamic password information input by the user is not received in the second preset time; or, determining whether the confirming sending password information input by the user is received in a second preset time specifically comprises: waiting, by the micro control unit, for receiving key interrupting and determining whether the key interrupting is received in the second preset time, if yes, the confirming sending dynamic password information input by the user is received in the second preset time; otherwise, the confirming sending dynamic password information input by the user is not received in the second preset time; correspondingly, Step S1 further comprises initializing key interrupting.

Preferably, computing and generating the dynamic password specifically comprises: computing and generating the dynamic password upon a preset key and an event factor; or computing and generating the dynamic password specifically comprises: computing and generating the dynamic password upon the challenge value, the preset key and the event factor; correspondingly, before computing and generating the dynamic password, the method further comprises: obtaining the challenge value from the return value of the first preset instruction returned from the near field communication chip and displaying the challenge value; or computing and generating the dynamic password specifically comprises: computing and generating the dynamic password upon the challenge value, the preset key, the event factor and the time factor; correspondingly, before computing and generating the dynamic password, the method further comprises: obtaining the challenge value from the return value of the first preset instruction returned from the near field communication chip and displaying the challenge value; or computing and generating the dynamic password specifically comprises: generating the dynamic password upon the preset key and the time factor; or computing and generating the dynamic password specifically comprises: obtaining the challenge value from the return value of the first preset instruction returned from the near field communication chip and displaying the challenge value.

Preferably, after Step S7 the method further comprises: waiting, by the micro control unit, for the return value of the second preset instruction returned from the near field communication chip, sending the second preset instruction containing the dynamic password generated by the token to the near field communication chip when the micro control unit reads the return value of the second preset instruction returned from the near field communication chip;

when the micro control unit reads the return value of the first preset instruction returned from the near field communication chip, before sending the second preset instruction containing the dynamic password generated by the token to the near field communication chip, the method further comprises: checking the state parameter in the return value of the first preset instruction, if the state parameter is a preset value, going back to Step S2; if the state parameter is not the preset value, sending the second preset instruction containing the dynamic password generated by the token to the near field communication chip;

when the micro control unit reads the return value of the second preset instruction returned from the near field communication chip, before sending the second preset instruction containing the dynamic password generated by the token to the near field communication chip, the method further comprises: checking the state parameter in the return value of the second preset instruction, if the state parameter is a preset value, going back to Step S2; if the state parameter is not the preset value, sending the second preset instruction containing the dynamic password generated by the token to the near field communication chip.

The advantages of the present invention includes that the token has good compatibility for mobile platform and manual operation of the user is reduced when the token is used, which simplifies operating procedure of a user.

DETAILED DESCRIPTION OF THE INVENTION

The technical solutions of the embodiments of the disclosure are described clearly and completely in conjunction with the accompanying drawings as follows. Apparently, the described embodiments are merely a part of but not all of the embodiments according to the disclosure. Based on the described embodiments of the disclosure, other embodiments obtained by those skilled in the art without any creative work belong to the scope of the disclosure.

The NFC token provided by the present invention is a device supporting NFC, which can exchange data with other devices supporting NFC in active mode or passive mode.

Embodiment 1

Figure 1:
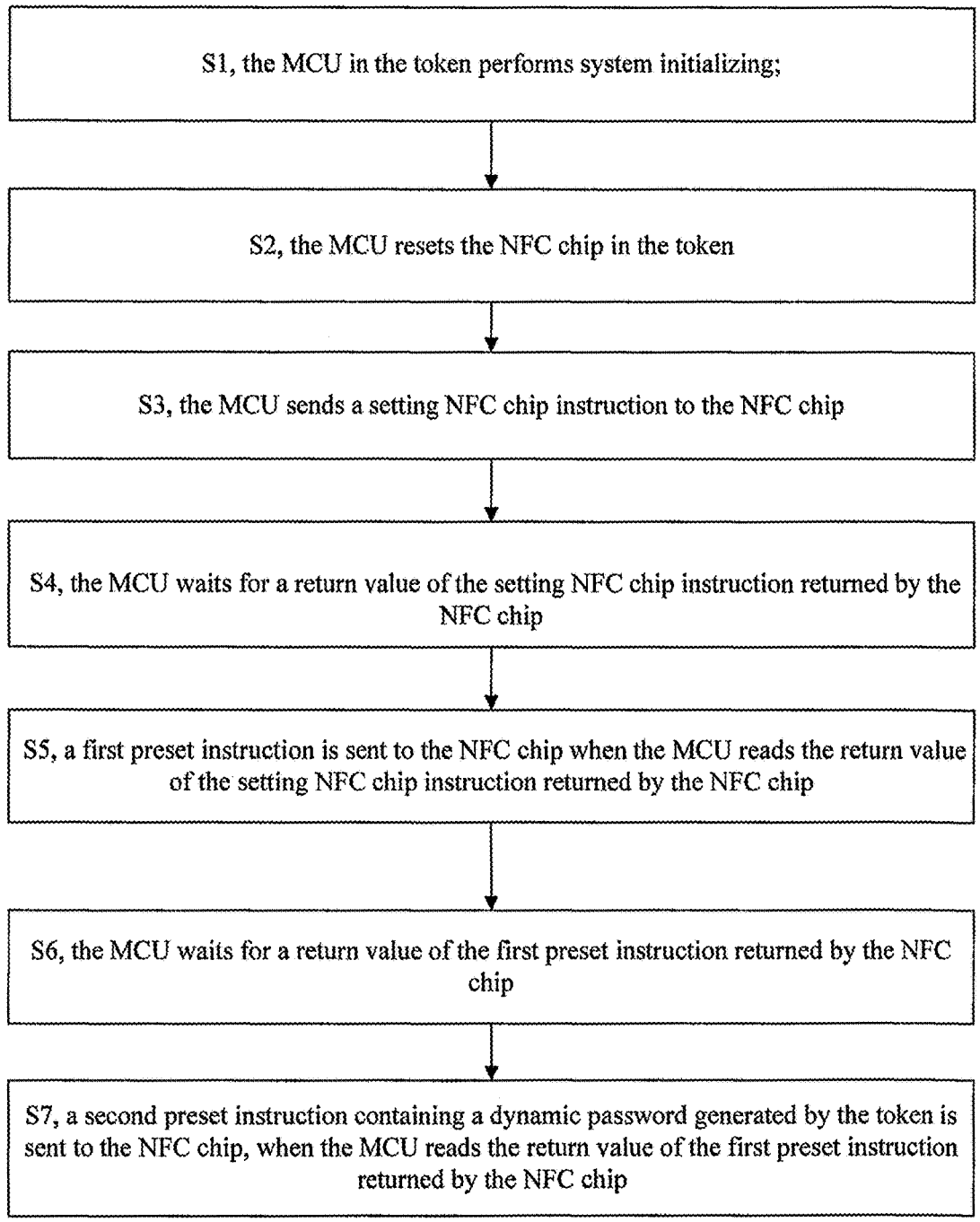
FIG. 1 is a flow diagram of a working method for an NFC token of Embodiment 1 of the present invention.

Embodiment 1 of the present invention provides a working method for an NFC token, the token comprises a Micro Control Unit (MCU) and Near Field Communication (NFC) chip. Referring to FIG. 1, the working method of the token specifically comprises:

Step S1, the MCU in the token performs system initializing;

Step S2, the MCU resets the NFC chip in the token;

Step S3, the MCU sends a setting NFC chip instruction to the NFC chip;

in Embodiment 1, Step S3 further comprises Step S3') setting a timeout limit of the NFC chip by the MCU;

Step S3' specifically comprises: the MCU sends a setting timeout limit instruction to the NFC chip; the setting timeout limit instruction contains a power up response timeout limit and communication timeout limit.

Step S4, the MCU waits for a return value of the setting NFC chip instruction returned from the NFC chip;

Step S5, a first preset instruction is sent to the NFC chip when the MCU reads the return value of the setting NFC chip instruction returned from the NFC chip;

Step S6, the MCU waits for a return value of the first preset instruction returned from the NFC chip;

Step S7, a second preset instruction containing a dynamic password generated by the token is sent to the NFC chip, when the MCU reads the return value of the first preset instruction returned from the NFC chip;

in Embodiment 1, before sending a second preset instruction containing a dynamic password generated by the token to the NFC chip when the MCU reads the return value of the first preset instruction returned from the NFC chip, the method further comprises: checking a state parameter in the return value of the first preset instruction, going back to Step S2 if the state parameter is a preset value; sending the second preset instruction containing the dynamic password generated by the token to the NFC chip if the state parameter is not the preset value;

before sending the second preset instruction containing the dynamic password generated by the token to the NFC chip, the method further includes computing and generating the dynamic password by the MCU.

In Embodiment 1, Step S2 further includes Step S2') waiting, by the MCU, for confirming start information input by a user, going to Step S3 when the confirming start information input by the user is received; otherwise, keep on waiting for the user to input the confirming start information;

Step S2' specifically includes checking, by the MCU, level of a key interrupting pin, executing Step S3 when the level of the key interrupting pin is high level, which represents that the confirming start information input by the user is received; keep on checking the level of the key interrupting pin when the level of the key interrupting pin is low level, which represents that the confirming start information input by the user is not received;

correspondingly, before sending, by the MCU, the first preset instruction to the NFC chip and/or sending, by the MCU, the second preset instruction containing the dynamic password generated by the token to the NFC chip, the method further includes checking the level of the key interrupting pin, keep on executing if the level is high level; going back to Step S2 if the level is low level; or Step S2' specifically includes: starting, by the MCU, key interrupting and checking a start flag; executing Step S3 when the start flag is set, which represents that the confirming start information input by the user is received; keep on checking the start flag when the start flag is not set, which represents that the confirming start information input by the user is not received;

correspondingly, Step S1 further includes initializing key interrupting by the MCU; checking whether the start flag is set when the MCU receives the key interrupting; if yes, exiting the key interrupting; otherwise, setting the start flag and exiting the key interrupting; or Step S2' specifically includes: initializing key interrupting by the MCU; checking the start flag, executing Step S3 when the start flag is set, which represents that the confirming start information input by the user is received; keep on checking the start flag when the start flag is not set, which represents that the confirming start information input by the user is not received;

correspondingly, Step S1 further includes initializing key interrupting by the MCU; and setting the key interrupting as rising edge triggering; checking whether the start flag is set when the MCU receives the key interrupting, if yes, exiting key interrupting, otherwise setting the start flag and setting key interrupting as falling edge triggering, exiting key interrupting.

In Embodiment 1, before computing and generating the dynamic password, the method further includes:

Step 30) the MCU prompts the user to input confirming generating password information;

Step 40) the MCU determines whether the confirming generating password information input by the user is received in a first preset time, if yes, computing and generating the dynamic password; otherwise, going back to Step S2.

Step 40 specifically includes checking, by the MCU, level of the key interrupting pin, determining whether the level of the interrupt pin changes to be high level in the first preset time, if yes, the confirming generating password information input by the user is received in the first preset time; otherwise, the confirming generating password information input by the user is not received in the first preset time; or Step 40 specifically includes waiting, by the MCU, for receiving key interrupting and determining whether the key interrupting is received in the first preset time, if yes, the confirming generating password information input by the user is received in the first preset time; otherwise, the confirming generating dynamic password information input by the user is not received in the first preset time;

correspondingly, Step S1 further comprises initializing key interrupting.

In Embodiment 1, when the MCU reads the return value of the first preset instruction returned from the near field communication chip, before sending the second preset instruction containing the dynamic password generated by the token to the near field communication chip, the method further comprises:

Step 50) prompting, by the MCU, the user to input confirming sending password information;

Step 60) determining, by the MCU, whether the confirming sending password information input by the user is received in a second preset time, if yes, sending the second preset instruction containing the dynamic password generated by the token to the NFC chip; otherwise, going back to Step S2;

Step 60 specifically includes: checking, by the MCU, the level of the key interrupting pin, determining whether the level of the interrupt pin changes to be high level in the second preset time, if yes, the confirming generating dynamic password information input by the user is received in the second preset time; otherwise, the confirming generating dynamic password information input by the user is not received in the second preset time; or Step 60 specifically includes: waiting, by the MCU, for receiving key interrupting and determining whether the key interrupting is received in the second preset time, if yes, the confirming sending password information input by the user is received in the second preset time; otherwise, the confirming generating dynamic password information input by the user is not received in the second preset time;

correspondingly, Step S1 further comprises initializing key interrupting.

In Embodiment 1, after Step S7, the method further includes: waiting, by the MCU, for the return value of the second preset instruction returned from the NFC chip, sending the second preset instruction containing the dynamic password generated by the token to the NFC chip when the MCU reads the return value of the second preset instruction returned from the NFC chip;

Further, when the MCU reads the return value of the second preset instruction returned from the NFC chip, before sending the second preset instruction containing the dynamic password generated by the token to the NFC chip, the method further comprises: checking the state parameter in the return value of the second preset instruction, if the state parameter is a preset value, going back to Step S2; if the state parameter is not the preset value, sending the second preset instruction containing the dynamic password generated by the token to the NFC chip.

Embodiment 2

Figure 2:
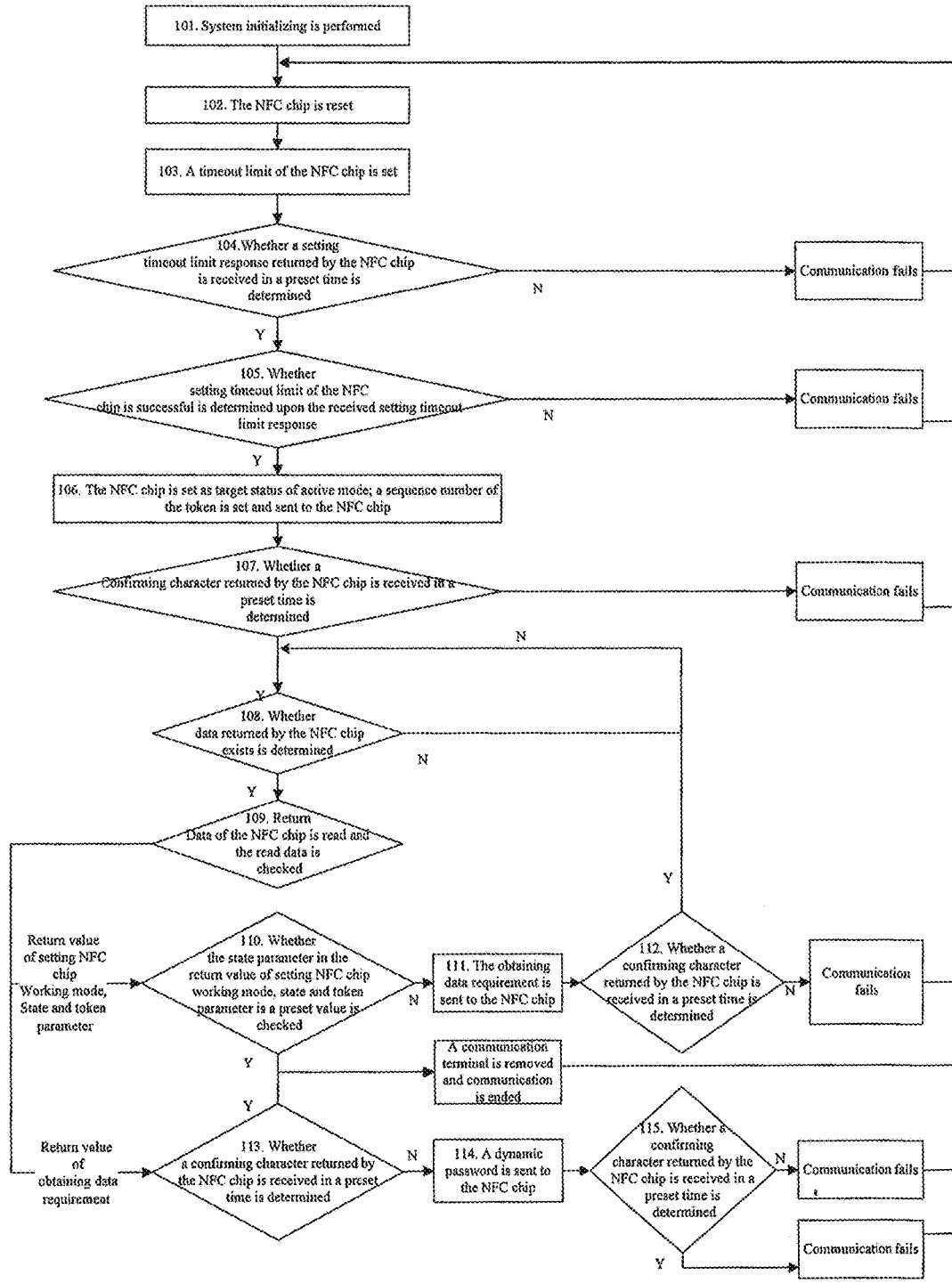
FIG. 2 is a flow diagram of a working method for an NFC token of Embodiment 2 of the present invention.

Embodiment 2 of the present invention provides a working method for an NFC token. The token includes an MCU and an NFC chip. The token as a target device communicates with an initiator. Referring to FIG. 2, the working method for the token specifically includes that the MCU of the token performs following steps:

Step 101, system initializing is performed;

Step 102, the NFC chip is reset;

Specifically, in Embodiment 2, resetting the NFC chip includes controlling its MCU_SPI_RST pin to output low level; after delaying a preset time, controlling its MCU_SPI_RST pin to output high level;

preferably, in Embodiment 2, before Step 102, the method can include: checking battery power and prompting that battery power is two low when the battery power is lower than preset battery power; specifically, that battery power is too low is prompted by displaying on a screen and/or changing color of an indicator lamp and/or buzzing and/or voice.

Step 103, a timeout limit of the NFC chip is set;

Specifically, in Embodiment 2, setting the timeout limit of the NFC chip includes: the MCU sends a setting timeout limit instruction to the NFC chip; the timeout limit instruction includes power up response timeout limit and communication timeout limit;

Preferably, in Embodiment 2, setting timeout limit instruction is RFConfiguration instruction with Cfqlten parameter of 0x02.

Step 104, whether a setting timeout limit response returned from the NFC chip is received in a preset time is determined, if yes, keep on execute Step 105; otherwise, communication fails and goes back to Step 102;

Step 105, whether setting timeout limit of the NFC chip is successful is determined upon the received setting timeout limit response, if yes, execute Step 106; otherwise, communication fails and goes back to Step 102;

Specifically, in Embodiment 2, determining whether setting timeout limit of the NFC chip is successful upon the received setting timeout limit response includes: determining whether the data on preset bytes of the received setting timeout limit response, if yes, setting the timeout limit of the NFC chip is successful; otherwise, setting the timeout limit of the NFC chip fails;

Preferably, in Embodiment 2, whether the data on the first three bytes of the received setting timeout limit response is 0x 00 00 FF is determined.

Step 106, the NFC chip is set as target status of active mode; a sequence number of the token is set and sent to the NFC chip;

Specifically, in Embodiment 2, Step 106 includes: setting the sequence number of the token, generating a configuring target device instruction upon the set sequence number of the token and sending the generated configuring target device instruction to the NFC chip;

Preferably, in Embodiment 2, the sequence number of the token is a data with 10 bytes; the configuring target device instruction is TgInitAsTarget instruction with mode parameter of 0x02.

Step 107, whether a confirming character returned from the NFC chip is received in a preset time is determined, if yes, keep on executing Step 108; otherwise, communication fails and goes back to Step 102;

Step 108, whether data returned from the NFC chip exists is determined, if yes, execute Step 109; otherwise, go back to Step 108;

In Embodiment 2, Step 108 specifically includes: waiting for data interrupting; when data interrupting is received, execute Step 109; otherwise, keep on waiting for data interrupting; or In Embodiment 2, Step 108 specifically includes inquiring the level of the data interrupting pin; when the level of the data interrupting pin is high level, execute Step 109; otherwise, keep on checking the level of the data interrupting pin.

Step 109, return data of the NFC chip is read and the read data is checked; if the data is a return value of setting NFC chip working mode, state and token parameter, execute Step 110; if the data is a return value of obtaining data requirement, execute Step 113;

In Embodiment 2, the return value of setting NFC chip working mode, state and token parameter specifically is configuring target device instruction response; the return value of obtaining data requirement specifically is receiving data instruction response;

Preferably, in Embodiment 2, the configuring target device instruction is TgInitAsTarget instruction with Mode parameter of 0x02; the receiving data instruction is TgGetData instruction.

Step 110, whether the state parameter in the return value of setting NFC chip working mode, state and token parameter is a preset value is checked; if yes, a communication terminal is removed, communication is ended and go back to Step 102; otherwise, execute Step 111;

In Embodiment 2, the state parameter specifically is status; the preset value specifically is 0x29.

Step 111, the obtaining data requirement is sent to the NFC chip; In Embodiment 2, Step 111 specifically includes generating and sending a receiving data instruction to the NFC chip;

Preferably, in Embodiment 2, the receiving data instruction is TgGetData instruction.

Step 112, whether a confirming character returned from the NFC chip is received in a preset time is determined, if yes, go to Step 108; otherwise, communication fails and goes back to Step 102;

Step 113, whether a state parameter in the return value of the obtaining data requirement is a preset value is checked, if yes, the communication terminal is removed and communication is ended, go back to Step 102; otherwise, go to Step 114;

In Embodiment 2, the state parameter specifically is status; the preset value specifically is 0x29.

Step 114, a dynamic password is sent to the NFC chip;

In Embodiment 2, Step 114 specifically includes: generating and sending a sending data instruction containing the dynamic password to the NFC chip;

Preferably, in Embodiment 2, the sending data instruction is TgSetData instruction.

In Embodiment 2, before Step 114, the method further includes computing and generating the dynamic password;

computing and generating the dynamic password specifically includes: computing and generating the dynamic password upon a key and an event factor which are preset in the token, and updating the event factor; or computing and generating the dynamic password specifically includes updating the event factor preset in the token and computing and generating the dynamic password upon the key and the event factor which are preset in the token;

further, in Embodiment 2, when the MCU reads the return value of the obtaining data requirement returned from the NFC chip, the method further includes obtaining the challenge value from the return value of the obtaining data requirement and displaying the challenge value;

correspondingly, computing and generating the dynamic password specifically includes: computing and generating the dynamic password upon the key and event factor which are preset in the token, updating the event factor; or computing and generating the dynamic password specifically includes: updating the event factor preset in the token, computing and generating the dynamic password upon the challenge value, and the key preset and the event factor which are preset in the token.

Further, in Embodiment 2, Step 101 further includes: starting timer interrupting and setting interrupting priority of the timer interrupting to be highest;

correspondingly, in Embodiment 2, when the MCU receives the timer interrupting, a timer factor preset in the token is updated;

computing and generating the dynamic password specifically includes: computing and generating the dynamic password upon the key and the time factor which are preset in the token; or, computing and generating the dynamic password includes: computing and generating the dynamic password upon the obtained challenge value, the key and the time factor which are preset in the token; or computing and generating the dynamic password specifically includes: computing and generating the dynamic password upon the obtained challenge value, the key and the event factor and the time factor which are preset in the token, and updating the event factor; or computing and generating the dynamic password specifically includes: updating the event factor preset in the token, computing and generating the dynamic password upon the obtained challenge value, the key and the time factor and the event factor which are preset in the token.

In Embodiment 2, before computing and generating the dynamic password, the method further includes: prompting the user to input confirming generating password information, checking the level of the key interrupting pin, determining whether the level of the key interrupting pin changes to be high level in a preset time; if yes, computing and generating the dynamic password; otherwise, go back to Step 102; or the method includes: prompting the user to input the confirming generating password information, waiting for receiving the key interrupting and determining whether the key interrupting is received in a preset time, if yes, computing and generating the dynamic password; otherwise, go back to Step 102.

In Embodiment 2, before Step 114, the method further includes: prompting the user to input the confirming sending password information, checking the level of the key interrupting pin, determining whether the level of the key interrupting pin changes to be high level in a preset time, if yes, go to Step 114; otherwise, go back to Step 102; or the method includes: prompting the user to input the confirming sending password information, waiting for receiving the key interrupting and determining whether the key interrupting is received in the preset time, if yes, go to Step 114; otherwise, go back to Step 102.

Step 115, whether the confirming character returned from the NFC chip is received in a preset time is determined, if yes, communication is successful, go back to Step 102; otherwise, communication fails, goes back to Step 102.

Further, in Embodiment 2, Step 109 further includes: if the read data is the return value of the sending dynamic password, checking whether the state parameter in the return value of the sending dynamic password is the preset value, if yes, the communication terminal is removed and communication is ended, go back to Step 102; otherwise, go to Step 114; in Embodiment 2, the state parameter specifically is status, the preset value specifically is 0x29.

Correspondingly, Step 115 is replaced with determining whether the confirming character returned from the NFC chip is received in the preset time, if yes, go back to Step 108; otherwise, communication fails, goes back to Step 102.

Embodiment 3

Figure 3:
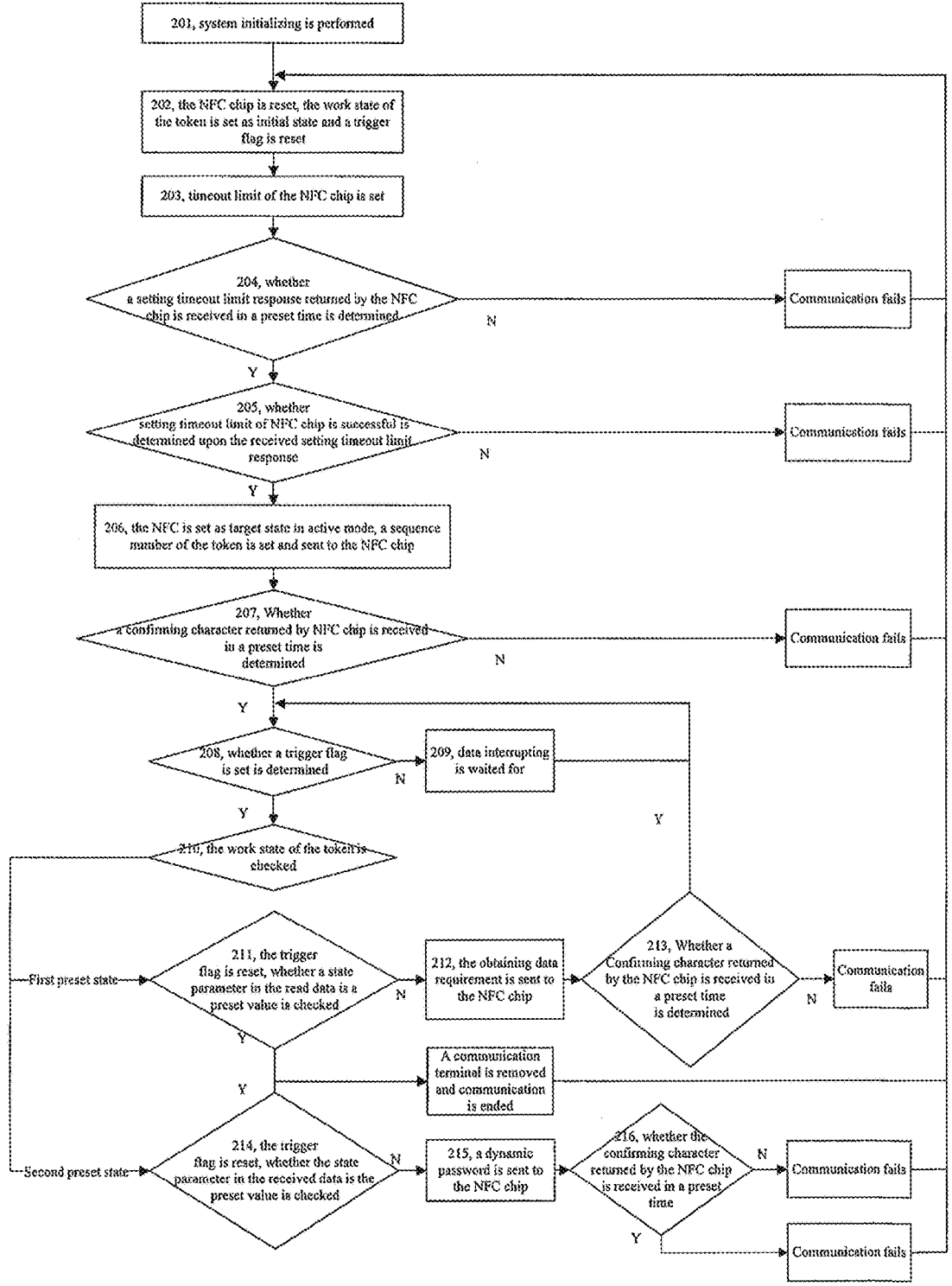
FIG. 3 is a flow diagram of a working method for an NFC token of Embodiment 3 of the present invention.
Figure 4:
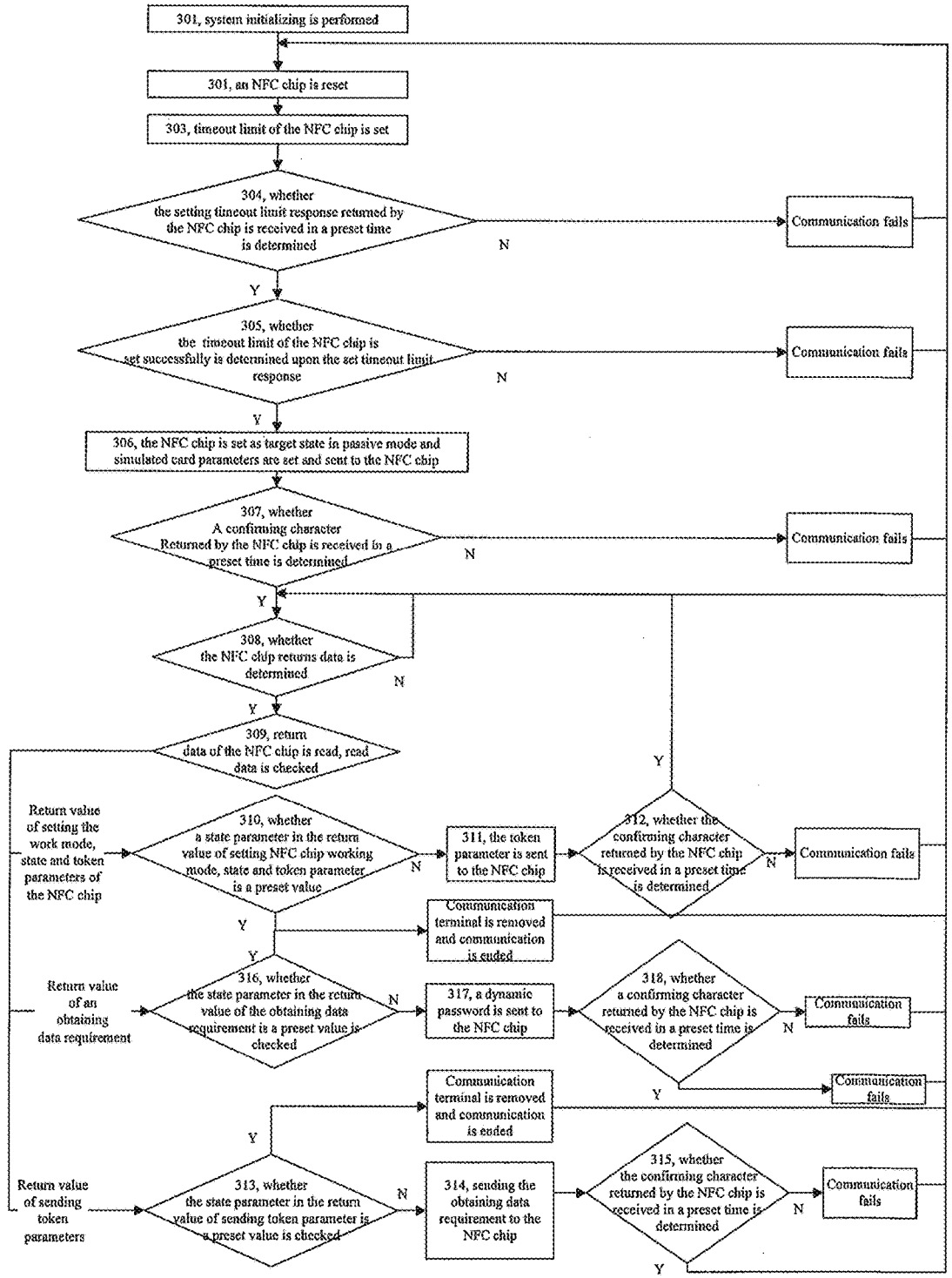
FIG. 4 is a flow diagram of a working method for an NFC token of Embodiment 4 of the present invention.
Figure 5:
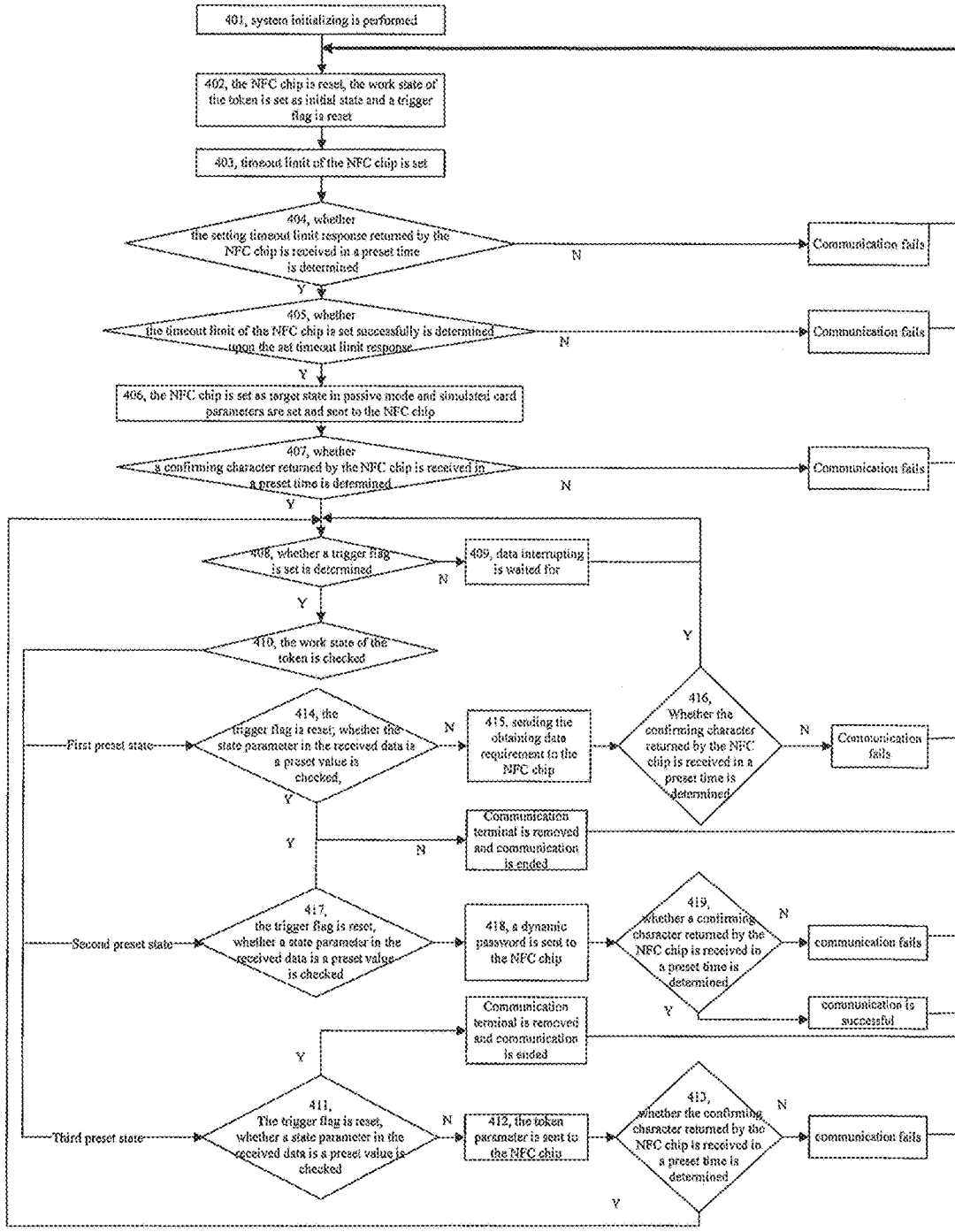
FIG. 5 is a flow diagram of a working method for an NFC token of Embodiment 5 of the present invention.

Embodiment 3 provides a working method for an NFC token, which is as a target device and communicates with an initiator in active mode. Referring to FIG. 3, the working method of the token specifically includes following step s performed by an MCU of the token.

Step 201, system initializing is performed;

Step 202, the NFC chip is reset, the work state of the token is set as initial state and a trigger flag is reset;

Specifically, in Embodiment 3, resetting the NFC chip includes that the MCU controls its MCU_SPI_RST pin to output low level, delays for a preset time and controls its MCU_SPI_RST pin to output high level;

Preferably, in Embodiment 3, before Step 202 the method further includes checking battery power, and prompting that battery power is too low when the battery power is lower than a preset battery power; specifically, that battery power is too low is prompted by displaying on a screen and/or changing color of an indicator lamp and/or buzzing and/or voice.

Step 203, timeout limit of the NFC chip is set;

Specifically, in Embodiment 3, setting the timeout time of the NFC chip includes that the MCU sends a setting timeout limit instruction to the NFC chip; the timeout limit instruction includes power up response timeout time and communication timeout time;

Preferably, in Embodiment 3, setting timeout limit instruction is RFConfiguration instruction with Cfqlten parameter of 0x02.

Step 204, whether a setting timeout limit response returned from the NFC chip is received in a preset time is determined, if yes, go to Step 205; otherwise, communication fails and goes back to Step 202;

Step 205, whether setting timeout limit of NFC chip is successful is determined upon the received setting timeout limit response, if yes, go to Step 206; otherwise, communication fails, goes back to Step 202;

Specifically, in Embodiment 3, whether setting timeout limit of NFC chip is successful is determined upon the received setting timeout limit response includes: determining whether data on preset bytes of the received setting timeout limit response is a preset character string, if yes, setting the timeout limit of NFC chip is successful; otherwise, setting timeout limit of NFC chip fails;

Preferably, in Embodiment 3, whether the data on the first three bytes of the received setting timeout limit response is 0x 00 00 FF is determined.

Step 206, the NFC is set as target state in active mode, a sequence number of the token is set and sent to the NFC chip;

Specifically, in Embodiment 3, Step 206 includes setting the sequence number of the token, generating a configuring target device instruction upon the set sequence number of the token and sending the configuring target device to the NFC chip;

Preferably, in Embodiment 3, the sequence number of the token is data of 10 bytes; the configuring target device instruction is TgInitAsTarget instruction with Mode parameter of 0x02.

Step 207, whether a confirming character returned from NFC chip is received in a preset time is determined, if yes, go to Step 208; otherwise, communication fails and goes back to Step 202;

Step 208, whether a trigger flag is set is determined, if yes, go to Step 210; otherwise, go to Step 209;

Step 209, data interrupting is waited for; go back to Step 208;

In Embodiment 3, when the MCU receives data interrupting, data returned from the NFC chip is read, read data is checked, if the read data is setting work mode, state of the NFC chip and the return value of the token parameter, the work state of the token is updated to a first preset state and the trigger flag is set; if the read data is a return value of an obtaining data requirement, the work state of the token is updated as a second preset state and the trigger flag is set;

Step 210, the work state of the token is checked, if the work state is a first preset state, go to Step 211; if the work state is the second preset state, go to Step 214;

Step 211, the trigger flag is reset, whether a state parameter in the read data is a preset value is checked, if yes, a communication terminal is removed and communication is ended, go back to Step 202; otherwise, go to Step 212;

In Embodiment 3, the state parameter specifically is status; the preset value specifically is 0x29.

Step 212, the obtaining data requirement is sent to the NFC chip;

In Embodiment 3, Step 212 specifically includes: generating and sending a receiving data instruction to the NFC chip;

Preferably, in Embodiment 3, the receiving data instruction is TgGetData instruction.

Step 213, whether a confirming character returned from the NFC chip is received in a preset time is determined, if yes, go to Step 208; otherwise, communication fails, goes back to Step 202;

Step 214, the trigger flag is reset, whether the state parameter in the received data is the preset value is checked, if yes, the communication terminal is removed, communication is ended, go back to Step 202; otherwise, go to Step 215;

In Embodiment 3, the state parameter specifically is status, the preset value specifically is 0x29.

Step 215, a dynamic password is sent to the NFC chip; in Embodiment 3, Step 215 specifically includes generating and sending a sending data instruction containing a dynamic password to the NFC chip;

Preferably, in Embodiment 3, the sending data instruction is TgSetData instruction.

In Embodiment 3, before Step 215, the method further includes computing and generating the dynamic password;

computing and generating the dynamic password specifically includes: computing and generating the dynamic password upon a key and an event factor which are preset in the token, updating the event factor; or computing and generating the dynamic password specifically includes: updating the event factor preset in the token, computing and generating the dynamic password upon the key and the event factor which are preset in the token.

Further, in Embodiment 3, when the MCU reads the return value of the obtaining data requirement returned from the NFC chip, the method further includes obtaining a challenge value from the return value of the obtaining data requirement;

correspondingly, computing and generating the dynamic password specifically includes: computing and generating the dynamic password upon the obtained challenge value, the key and the event which are preset in the token, updating the event factor; or, computing and generating the dynamic password specifically includes: updating the event factor preset in the token, computing and generating the dynamic password upon the obtained challenge value, the key and the event which are preset in the token.

Further, in Embodiment 3, Step 201 further includes: starting timer interrupting and setting interrupting priority of the timer interrupting to be the highest;

correspondingly, in Embodiment 3, when the MCU receives the timer interrupting, the time factor preset in the new token is updated;

computing and generating the dynamic password specifically includes: computing and generating the dynamic password upon the key and the time factor which are preset in the token; or computing and generating the dynamic password specifically comprises: computing and generating the dynamic password upon the obtained challenge value, the key and the time factor which are preset in the token; or, computing and generating the dynamic password specifically comprises: computing and generating the dynamic password upon the obtained challenge value, the key and the event factor which are preset in the token, and updating the event factor; or computing and generating the dynamic password specifically comprises: updating the event factor preset in the token, computing and generating the dynamic password upon the obtained challenge value, the key, the time factor and the event factor which are preset in the token.

In Embodiment 3, before computing and generating the dynamic password, the method further comprises: prompting the user to input confirming generating dynamic password information, checking level of a key interrupting pin, determining whether the level of the key interrupting pin changes to be high level in a preset time, if yes, computing and generating the dynamic password, otherwise, going back to Step 202.

In Embodiment 3, before Step 215, the method further comprises: prompting the user to input confirming sending password information, checking the level of the key interrupting pin, determining whether the level of the key interrupting pin changes to be high level in a preset time, if yes, going to Step 215; otherwise, going back to Step 202; or before Step 215, the method further comprises: prompting the user to input the confirming sending password information, waiting for receiving the key interrupting, determining whether the key interrupting is received in a preset time, if yes, going to Step 215; otherwise, going back to Step 202.

Step 216, whether the confirming character returned from the NFC chip is received in a preset time, if yes, communication is successful, going back to Step 202; otherwise, communication fails, going back to Step 202.

Further, in Embodiment 3, when the MCU receives the data interrupting, the method further comprises: if the read data is a return value of the sending dynamic password, setting the trigger flag;

correspondingly, Step 216 is replaced with determining whether the confirming character returned from the NFC chip is received, if yes, going back to Step 208; otherwise, communication fails and going back to Step 202.

Embodiment 4

Embodiment 4 provides a working method for an NFC token, which is as a target device and communicates with an initiator in passive mode. Referring to FIG. 3, the working method of the token specifically includes following steps performed by an MCU of the token.

Step 301, system initializing is performed;

Step 302, an NFC chip is reset;

Specifically, in Embodiment 4, resetting the NFC chip includes: controlling, by the MCU, its MCU_SPI_RST pin to output low level and controlling its MCU_SPI_RST pin to output high level after delaying a preset time;

Preferably, in Embodiment 4, before Step 302, the method further includes: checking battery power and prompting that battery power is too low when the battery power is lower than a preset battery power; specifically, that battery power is too low is prompted by displaying on a screen and/or changing color of an indicator lamp and/or buzzing and/or voice.

Step 303, timeout limit of the NFC chip is set;

Specifically, in Embodiment 4, setting the timeout limit of the NFC chip includes: sending, by the MCU, a setting timeout limit instruction to the NFC chip, the timeout limit instruction includes power up response timeout limit and communication timeout limit;

Preferably, in Embodiment 4, setting timeout limit instruction is RFConfiguration instruction with Cfqlten parameter of 0x02.

Step 304, whether the setting timeout limit response returned from the NFC chip is received in a preset time is determined, if yes, go to Step 305; otherwise, communication fails and goes back to Step 302;

Step 305, whether the timeout limit of the NFC chip is set successfully is determined upon the set timeout limit response, if yes, go to Step 306; otherwise, communication fails and goes back to Step 302;

Specifically, in Embodiment 4, whether the timeout limit of the NFC chip is set successfully is determined upon the set timeout limit response comprises: determining whether the data on the preset byte of the received setting timeout limit response is a preset character string, if yes, setting timeout limit of the NFC chip is successful, otherwise, setting the timeout limit of the NFC chip fails;

Preferably, in Embodiment 4, whether the data on the first three bytes of the received setting timeout limit response is 0x 00 00 FF is determined.

Step 306, the NFC chip is set as target state in passive mode and simulated card parameters are set and sent to the NFC chip;

Specifically, in Embodiment 4, Step 306 includes: setting the parameters of the simulated card, generating a configuring target device instruction upon the set the simulated card parameters and sending the configuring target device instruction to the NFC chip;

Preferably, in Embodiment 4, the configuring target device instruction is TgInitAsTarget instruction with Mode parameter of 0x04; the simulated card parameters include simulated card type and simulated card ID; for example, the simulated card type includes Felica card, Mifare card, etc.

Step 307, whether a confirming character returned from the NFC chip is received in a preset time is determined, if yes, go to Step 308; otherwise, communication fails and goes back to Step 302;

Step 308, whether the NFC chip returns data is determined, if yes, go to Step 309; otherwise, go back to Step 308;

in Embodiment 4, Step 308 specifically includes: waiting for data interrupting, executing Step 309 when the data interrupting is received; otherwise, waiting for data interrupting; or in Embodiment 4, Step 308 specifically includes: checking the level of the data interrupting pin, executing Step 309 if the level of the data interrupting pin is high level; otherwise, keep on checking the level of the data interrupting pin.

Step 309, return data of the NFC chip is read, read data is checked; if the read data is the return value of setting the work mode, state and token parameters of the NFC chip, go to Step 310; if the return data is the return value of sending token parameters, go to Step 313; if the read data is a return value of an obtaining data requirement, go to Step 316;

In Embodiment 4, the return data of setting the work mode, state and token parameters of the NFC chip specifically is a response of setting target device instruction; the return value of the obtaining data requirement specifically is response of the obtaining data requirement;

Preferably, in Embodiment 4, the configuring target device instruction is TgInitAsTarget instruction with Mode parameter of 0x04; responding initiator instruction is TgResponseToInitiator instruction; obtaining data instruction is TgGetInitiator.

Step 310, whether a state parameter in the return value of setting NFC chip working mode, state and token parameter is a preset value, if yes, the communication terminal is removed and communication is ended, go back to Step 302; otherwise, go to Step 311;

In Embodiment 4, the state parameter specifically is status, the preset value specifically is 0x29.

Step 311, the token parameter is sent to the NFC chip;

in Embodiment 4, Step 311 specifically includes: generating and sending the responding initiator instruction containing the token parameter to the NFC chip;

Preferably, in Embodiment 4, the responding intiator instruction is TgResponseToInitiator instruction.

Step 312, whether the confirming character returned from the NFC chip is received in a preset time is determined, if yes, go back to Step 308; otherwise, communication fails and goes back to Step 302;

Step 313, whether the state parameter in the return value of sending token parameter is a preset value is checked, if yes, the communication terminal is removed and communication is ended, go back to Step 302; otherwise, go back to Step 314;

in Embodiment 4, the state parameter specifically is status, the preset value specifically is 0x29.

Step 314, sending the obtaining data requirement to the NFC chip;

in Embodiment 4, Step 314 specifically includes: generating and sending an obtaining data instruction to the NFC chip;

Preferably, in Embodiment 4, the obtaining data instruction is TgGetInitiator instruction.

Step 315, whether the confirming character returned from the NFC chip is received in a preset time is determined, if yes, go back to Step 308; otherwise, communication fails, going back to Step 302;

Step 316, whether the state parameter in the return value of the obtaining data requirement is a preset value is checked, if yes, communication terminal is removed and communication is ended, go back to Step 302; otherwise, go to Step 317;

in Embodiment 4, the state parameter specifically is status, the preset value specifically is 0x29.

Step 317, a dynamic password is sent to the NFC chip;

in Embodiment 4, Step 317 specifically includes: sending the responding initiator instruction containing the dynamic password to the NFC chip;

Preferably, in Embodiment 4, the responding initiator instruction is TgResponseToInitiator instruction;

In Embodiment 4, before Step 317, the method further includes: computing and generating the dynamic password;

computing and generating the dynamic password specifically includes: computing and generating the dynamic password upon a key and an event factor which are preset in the token and updating the event factor; or, computing and generating the dynamic password specifically includes: updating the event factor preset in the token and computing and generating the dynamic password upon the key and the event factor which are preset in the token;

Further, in Embodiment 4, when the MCU reads the return value of the obtaining data requirement of the NFC chip, the method further includes obtaining a challenge value from the return value of the obtaining data requirement;

correspondingly, computing and generating the dynamic password specifically includes: generating the dynamic password upon the obtained challenge value, the key and the event factor which are preset in the token and updating the event factor; or, computing and generating the dynamic password specifically includes: updating the event factor preset in the token, computing and generating the dynamic password upon the obtained challenge value, the key preset in the token and the event factor.

Further, in Embodiment 4, Step 301 further includes: starting timer interrupting and setting interrupting priority of the timer interrupting to be the highest;

Correspondingly, in Embodiment 4, when the MCU receives the timer interrupting, a time factor preset in the token is updated;

computing and generating the dynamic password specifically includes: computing and generating the dynamic password upon the key and the time factor which are preset in the token; or, computing and generating the dynamic password specifically includes: computing and generating the dynamic password upon the obtained challenge value, the key and the time factor which are preset in the token; or, computing and generating the dynamic password specifically includes: computing and generating the dynamic password upon the obtained challenge value, the key and the event factor and the time factor which are preset in the token and updating the event factor; or computing and generating the dynamic password specifically includes: updating the event factor preset in the token, computing and generating the dynamic password upon the obtained challenge value, the key, the time factor and the event factor which are preset in the token.

In Embodiment 4, computing and generating the dynamic password further includes: prompting the user to input confirming generating password information, checking whether the level of the key interrupting pin changes to be high level in a preset time, if yes, computing and generating the dynamic password, otherwise, go back to Step 302; or computing and generating the dynamic password further includes: prompting the user to input confirming generating password information, waiting for receiving key interrupting and determining whether the key interrupting is received in a preset time, if yes, computing and generating the dynamic password, otherwise, going back to Step 302.

In Embodiment 4, before Step 317, the method further includes: prompting the user to input confirming sending password information, checking the level of the key interrupting pin, determining whether the level of the key interrupting pin changes to be high level in a preset time, if yes, going to Step 317; otherwise, going back to Step 302; or before Step 317, the method further includes: prompting the user to input confirming sending password information, waiting for receiving key interrupting and determining whether the key interrupting is received in a preset time, if yes, going to Step 317; otherwise, going back to Step 302.

Step 318, whether a confirming character returned from the NFC chip is received in a preset time is determined, if yes, communication is successful, going back to Step 302; otherwise, communication fails and going back to Step 302.

Further, in Embodiment 4, Step 309 further includes: if the read data is a return value of sending dynamic password, the state parameter of the return value of checking sending dynamic password is a preset value, if yes, communication terminal is removed and communication is ended, going back to Step 302; otherwise, going to Step 317;

In Embodiment 4, the state parameter specifically is status, the preset value specifically is 0x29.

Correspondingly, Step 318 is replaced with determining whether a confirming character returned from the NFC chip is received in a preset time, if yes, going back to Step 308; otherwise, communication fails, going back to Step 302.

Embodiment 5

Embodiment 5 provides a working method for an NFC token, which is as a target device and communicates with an initiator in passive mode. Referring to FIG. 3, the working method of the token specifically includes following steps performed by an MCU of the token.

Step 401, system initializing is performed;

Step 402, the NFC chip is reset, the work state of the token is set as initial state and a trigger flag is reset;

specifically, in Embodiment 5, resetting the NFC chip includes: controlling, by an MCU, its MCU_SPI_RST pin to output low level; after a delayed preset time, controlling its MCU_SPI_RST pin to output high level;

in Embodiment 5, before Step 402, the method further includes: checking battery power and prompting that battery power is too low when the battery power is lower than a preset battery power; specifically, that battery power is too low is prompted by displaying on a screen and/or changing color of an indicator lamp and/or buzzing and/or voice.

Step 403, timeout limit of the NFC chip is set;

Specifically, in Embodiment 5, setting the timeout limit of the NFC chip includes: sending, by the MCU, a setting timeout limit instruction to the NFC chip, the timeout limit instruction includes power up response timeout limit and communication timeout limit;

Preferably, in Embodiment 5, setting timeout limit instruction is RFConfiguration instruction with Cfqlten parameter of 0x02.

Step 404, whether the setting timeout limit response returned from the NFC chip is received in a preset time is determined, if yes, go to Step 405; otherwise, communication fails and goes back to Step 402;

Step 405, whether the timeout limit of the NFC chip is set successfully is determined upon the set timeout limit response, if yes, go to Step 406; otherwise, communication fails and goes back to Step 402;

Specifically, in Embodiment 5, whether the timeout limit of the NFC chip is set successfully is determined upon the set timeout limit response includes: determining whether the data on the preset byte of the received setting timeout limit response is a preset character string, if yes, setting timeout limit of the NFC chip is successful, otherwise, setting the timeout limit of the NFC chip fails;

Preferably, in Embodiment 5, whether the data on the first three bytes of the received setting timeout limit response is 0x 00 00 FF is determined.

Step 406, the NFC chip is set as target state in passive mode and simulated card parameters are set and sent to the NFC chip;

specifically, in Embodiment 5, Step 406 includes: setting the parameters of the simulated card, generating a configuring target device instruction upon the set the simulated card parameters and sending the configuring target device instruction to the NFC chip;

preferably, in Embodiment 5, the configuring target device instruction is TgInitAsTarget instruction with Mode parameter of 0x04; the simulated card parameters include simulated card type and simulated card ID; for example, the simulated card type includes Felica card, Mifare card, etc.

Step 407, whether a confirming character returned from the NFC chip is received in a preset time is determined, if yes, go to Step 408; otherwise, communication fails and goes back to Step 402;

Step 408, whether a trigger flag is set is determined, if yes, go to Step 410; otherwise, go to Step 409;

Step 409, data interrupting is waited for; go back to Step 208;

In Embodiment 5, when the MCU receives data interrupting, data returned from the NFC chip is read, read data is checked, if the read data is setting work mode, state of the NFC chip and the return value of the token parameter, the work state of the token is updated to a first preset state and the trigger flag is set; if the read data is a return value of an obtaining data requirement, the work state of the token is updated as a second preset state and the trigger flag is set;

In Embodiment 5, the return data of setting the work mode, state and token parameters of the NFC chip specifically is a response of setting target device instruction; the return value of obtaining data requirement specifically is response of obtaining data requirement;

Preferably, in Embodiment 5, the configuring target device instruction is TgInitAsTarget instruction; responding initiator instruction is TgResponseToInitiator instruction; the return value of obtaining data requirement is response of TgGetInitiator instruction.

Step 410, the work state of the token is checked, if the work state is a third state, go to Step 411; if the work state is a first preset state, go to Step 414; if the work state is the second preset state, go to Step 417;

Step 411, the trigger flag is reset, whether a state parameter in the received data is a preset value is checked, if yes, a communication terminal is removed and communication is ended, go back to Step 402; otherwise, go to Step 412;

In Embodiment 5, the state parameter specifically is status; the preset value specifically is 0x29.

Step 412, the token parameter is sent to the NFC chip;

in Embodiment 5, Step 412 specifically includes: generating and sending the responding initiator instruction containing the token parameter to the NFC chip;

Preferably, in Embodiment 5, the responding initiator instruction is TgResponseToInitiator instruction.

Step 413, whether the confirming character returned from the NFC chip is received in a preset time is determined, if yes, go back to Step 408; otherwise, communication fails and goes back to Step 402;

Step 414, the trigger flag is reset; whether the state parameter in the received data is a preset value is checked, if yes, the communication terminal is removed and communication is ended, go back to Step 402; otherwise, go back to Step 415;

in Embodiment 5, the state parameter specifically is status, the preset value specifically is 0x29.

Step 415, sending the obtaining data requirement to the NFC chip;

in Embodiment 5, Step 415 specifically includes: generating and sending an obtaining data instruction to the NFC chip;

Preferably, in Embodiment 5, the obtaining data instruction is TgGetInitiator instruction.

Step 416, whether the confirming character returned from the NFC chip is received in a preset time is determined, if yes, go back to Step 408; otherwise, communication fails, going back to Step 402;

Step 417, the trigger flag is reset, whether a state parameter in the received data is a preset value is checked, if yes, a communication terminal is removed and communication is ended, go back to Step 402; otherwise, go to Step 418;

In Embodiment 5, the state parameter specifically is status; the preset value specifically is 0x29.

Step 418, a dynamic password is sent to the NFC chip;

In Embodiment 5, Step 418 specifically includes: sending the responding initiator instruction containing the dynamic password to the NFC chip;

Preferably, in Embodiment 5, the responding initiator instruction is TgResponseToInitiator instruction;

in Embodiment 5, before Step 418, the method further includes: computing and generating the dynamic password;

computing and generating the dynamic password specifically includes: computing and generating the dynamic password upon a key and an event factor which are preset in the token and updating the event factor; or, computing and generating the dynamic password specifically includes: updating the event factor preset in the token and computing and generating the dynamic password upon the key and the event factor which are preset in the token;

further, in Embodiment 5, when the MCU reads the return value of the obtaining data requirement of the NFC chip, the method further includes obtaining a challenge value from the return value of the obtaining data requirement;

correspondingly, computing and generating the dynamic password specifically includes: generating the dynamic password upon the obtained challenge value, the key and the event factor which are preset in the token and updating the event factor; or, computing and generating the dynamic password specifically includes: updating the event factor preset in the token, computing and generating the dynamic password upon the obtained challenge value, the key and the event factor which are preset in the token.

Further, in Embodiment 5, Step 401 can further include: starting timer interrupting and setting interrupting priority of the timer interrupting to be the highest;

correspondingly, in Embodiment 5, when the MCU receives the timer interrupting, a time factor preset in the token is updated;

computing and generating the dynamic password specifically includes: computing and generating the dynamic password upon the key and the time factor which are preset in the token; or, computing and generating the dynamic password specifically includes: computing and generating the dynamic password upon the obtained challenge value, the key and the time factor which are preset in the token; or computing and generating the dynamic password specifically includes: computing and generating the dynamic password upon the obtained challenge value, the key and the event factor and the time factor which are preset in the token; and updating the event factor; or, computing and generating the dynamic password specifically includes: updating the event factor preset in the token, computing and generating the dynamic password upon the obtained challenge value, the key, the time factor and the event factor which are preset in the token.

In Embodiment 5, computing and generating the dynamic password further includes: prompting the user to input confirming generating password information, checking whether the level of the key interrupting pin changes to be high level in a preset time, if yes, computing and generating the dynamic password, otherwise, go back to Step 402; or computing and generating the dynamic password further includes: prompting the user to input confirming generating password information, waiting for receiving key interrupting and determining whether the key interrupting is received in a preset time, if yes, computing and generating the dynamic password, otherwise, going back to Step 402.

In Embodiment 5, before Step 418, the method further includes: prompting the user to input confirming sending password information, checking the level of the key interrupting pin, determining whether the level of the key interrupting pin changes to be high level in a preset time, if yes, going to Step 418; otherwise, going back to Step 402; or before Step 418, the method further includes: prompting the user to input confirming sending password information, waiting for receiving key interrupting and determining whether the key interrupting is received in a preset time, if yes, going to Step 418; otherwise, going back to Step 402.

Step 419, whether a confirming character returned from the NFC chip is received in a preset time is determined, if yes, communication is successful, going back to Step 402; otherwise, communication fails, going back to Step 402.

Further, in Embodiment 5, when the MCU receives data interrupting, the method further includes: setting the trigger flag if the read data is the return value of sending dynamic password;

Correspondingly, Step 419 is replaced with determining whether a confirming character returned from the NFC chip is received in a preset time, if yes, go back to Step 408; otherwise, communication fails, going back to Step 402.

Embodiment 6

Figure 6:
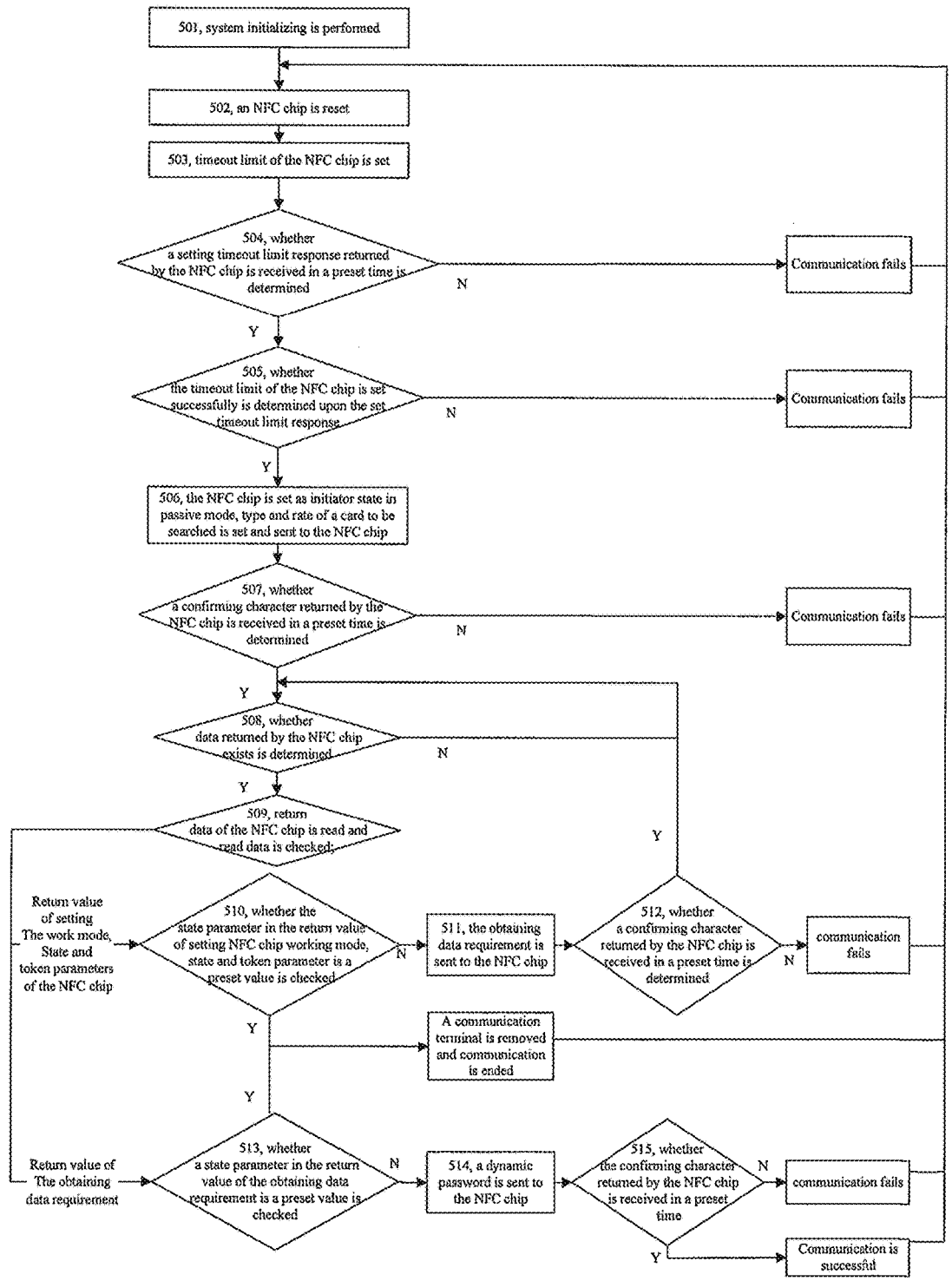
FIG. 6 is a flow diagram of a working method for an NFC token of Embodiment 6 of the present invention.

Embodiment 6 provides a working method for an NFC token, which is as a target device and communicates with an initiator in passive mode. Referring to FIG. 6, the working method of the token specifically includes following steps performed by an MCU of the token.

Step 501, system initializing is performed;
Step 502, an NFC chip is reset;
specifically, in Embodiment 6, resetting the NFC chip includes: controlling, by an MCU, its MCU_SPI_RST pin to output low level; after a delayed preset time, controlling its MCU_SPI_RST pin to output high level;

preferably, in Embodiment 6, before Step 502, the method further includes: checking battery power and prompting that battery power is too low when the battery power is lower than a preset battery power; specifically, that battery power is too low is prompted by displaying on a screen and/or changing color of an indicator lamp and/or buzzing and/or voice.

Step 503, timeout limit of the NFC chip is set;
Specifically, in Embodiment 6, setting the timeout limit of the NFC chip includes: sending, by the MCU, a setting timeout limit instruction to the NFC chip, the timeout limit instruction includes power up response timeout limit and communication timeout limit;

Preferably, in Embodiment 6, setting timeout limit instruction is RFConfiguration instruction with Cfqlten parameter of 0x02.

Step 504, whether a setting timeout limit response returned from the NFC chip is received in a preset time is determined, if yes, go to Step 505; otherwise, communication fails and goes back to Step 502;

Step 505, whether the timeout limit of the NFC chip is set successfully is determined upon the set timeout limit response, if yes, go to Step 506; otherwise, communication fails and goes back to Step 502;

Specifically, in Embodiment 6, whether the timeout limit of the NFC chip is set successfully is determined upon the set timeout limit response includes: determining whether the data on the preset byte of the received setting timeout limit response is a preset character string, if yes, setting timeout limit of the NFC chip is successful, otherwise, setting the timeout limit of the NFC chip fails;

Preferably, in Embodiment 6, whether the data on the first three bytes of the received setting timeout limit response is 0x 00 00 FF is determined.

Step 506, the NFC chip is set as initiator state in passive mode, type and rate of a card to be searched is set and sent to the NFC chip;

Specifically, in Embodiment 6, Step 506 includes: initializing a configuration initiator instruction, setting the type and the rate of the card to be searched, setting the card searching parameters in the initiator instruction upon the type and rate of the card to be searched, sending the configuration initiator instruction to the NFC chip;

Preferably, in Embodiment 6, the configuration initiator instruction is InLisPassiveTarget instruction. Step 506 includes: initializing InLisPassiveTarget instruction, setting the type and rate of the card to be searched; setting BrTy parameter of the InLisPassiveTarget instruction upon the type and rate of the card to be searched, sending the InLisPassiveTarget instruction to the NFC chip;

For example, if the set type and rate of the card to be searched are A type card and 106 kbps of ISO/IEC14443 protocol, BrTy parameter of the InLisPassiveTarget instruction is set as 0x00;

if the set type and rate of the card to be searched are FeliCa polling card and 212 kbps, BrTy parameter of the InLisPassiveTarget instruction is set as 0x01;

if the set type and rate of the card to be searched are FeliCa polling card and 424 kbps, BrTy parameter of the InLisPassiveTarget instruction is set as 0x02;

if the set type and rate of the card to be searched are B type card and 106 kbps of ISO/IEC14443-3 protocol, BrTy parameter of the InLisPassiveTarget instruction is set as 0x03;

if the set type and rate of the card to be searched are Innovision Jewel tag card and 106 kbps, BrTy parameter of the InLisPassiveTarget instruction is set as 0x04.

Step 507, whether a confirming character returned from the NFC chip is received in a preset time is determined, if yes, go to Step 508; otherwise, communication fails and goes back to Step 502;

Step 508, whether data returned from the NFC chip exists is determined, if yes, go to Step 509; otherwise, go back to Step 508;

in Embodiment 6, Step 508 specifically includes: waiting for data interrupting, executing Step 509 when the data interrupting is received; otherwise, waiting for data interrupting; or in Embodiment 6, Step 508 specifically includes: checking the level of the data interrupting pin, executing Step 509 if the level of the data interrupting pin is high level; otherwise, keep on checking the level of the data interrupting pin.

Step 509, return data of the NFC chip is read and read data is checked; if the read data is a return value of setting the work mode, state and token parameters of the NFC chip, go to Step 510; if the read data is a return value of an obtaining data requirement, go to Step 513;

In Embodiment 6, the return data of setting the work mode, state and token parameters of the NFC chip specifically is a response of the configuration initiator instruction; the return value of the obtaining data requirement specifically is a return value of a data exchange instruction;

Preferably, in Embodiment 6, the configuration initiator instruction is InLisPassiveTarget instruction and the data exchange instruction is InDataExchange instruction.

Step 510, whether the state parameter in the return value of setting NFC chip working mode, state and token parameter is a preset value is checked; if yes, a communication terminal is removed, communication is ended and go back to Step 102; otherwise, execute Step 511;

In Embodiment 6, the state parameter specifically is status; the preset value specifically is 0x29.

Step 511, the obtaining data requirement is sent to the NFC chip;

In Embodiment 6, Step 511 specifically includes: generating and sending the data exchange instruction to the NFC chip;

Preferably, in Embodiment 6, the data exchange instruction is InDataExchange instruction.

Step 512, whether a confirming character returned from the NFC chip is received in a preset time is determined, if yes, go to Step 508; otherwise, communication fails and goes back to Step 502;

Step 513, whether a state parameter in the return value of the obtaining data requirement is a preset value is checked, if yes, the communication terminal is removed and communication is ended, go back to Step 502; otherwise, go to Step 514;

in Embodiment 6, the state parameter specifically is status; the preset value specifically is 0x29.

Step 514, a dynamic password is sent to the NFC chip;

In Embodiment 6, Step 514 specifically includes: generating and sending the data exchanging instruction containing the dynamic password to the NFC chip;

Preferably, in Embodiment 6, the data exchanging instruction is InDataExchange instruction.

In Embodiment 6, before Step 514, the method further includes computing and generating the dynamic password;

computing and generating the dynamic password specifically includes: computing and generating the dynamic password upon a key and an event factor which are preset in the token, and updating the event factor; or computing and generating the dynamic password specifically includes: updating the event factor preset in the token and computing and generating the dynamic password upon the key and the event factor which are preset in the token.

Further, in Embodiment 6, when the MCU reads the return value of the obtaining data requirement returned from the NFC chip, the method further includes obtaining the challenge value from the return value of the obtaining data requirement and displaying the challenge value;

correspondingly, computing and generating the dynamic password specifically includes: computing and generating the dynamic password upon the key and event factor which are preset in the token, updating the event factor; or computing and generating the dynamic password specifically includes: updating the event factor preset in the token, computing and generating the dynamic password upon the obtained challenge value, and the key and the event factor which are preset in the token.

Further, in Embodiment 6, Step 501 can further include: starting timer interrupting and setting interrupting priority of the timer interrupting to be highest;

correspondingly, in Embodiment 6, when the MCU receives the timer interrupting, a timer factor preset in the token is updated;

computing and generating the dynamic password specifically includes: computing and generating the dynamic password upon the key and the time factor which are preset in the token. Or, computing and generating the dynamic password includes: computing and generating the dynamic password upon the obtained challenge value, the key and the time factor which are preset in the token; or computing and generating the dynamic password specifically includes: computing and generating the dynamic password upon the obtained challenge value, the key and the time factor and the event factor which are preset in the token; or computing and generating the dynamic password specifically includes: updating the event factor preset in the token, computing and generating the dynamic password upon the obtained challenge value, the key and the time factor and the event factor which are preset in the token.

In Embodiment 6, before computing and generating the dynamic password, the method further includes: prompting the user to input confirming generating password information, checking the level of the key interrupting pin, determining whether the level of the key interrupting pin changes to be high level in a preset time; if yes, computing and generating the dynamic password; otherwise, go back to Step 502; or the method includes: prompting the user to input the confirming generating password information, waiting for receiving the key interrupting and determining whether the key interrupting is received in a preset time, if yes, computing and generating the dynamic password; otherwise, go back to Step 502.

In Embodiment 6, before Step 514, the method further comprises: prompting the user to input confirming sending password information, checking the level of the key interrupting pin, determining whether the level of the key interrupting pin changes to be high level in a preset time, if yes, going to Step 514; otherwise, going back to Step 502; or before Step 514, the method further comprises: prompting the user to input the confirming sending password information, waiting for receiving the key interrupting, determining whether the key interrupting is received in a preset time, if yes, going to Step 514; otherwise, going back to Step 502.

Step 515, whether the confirming character returned from the NFC chip is received in a preset time, if yes, communication is successful, going back to Step 502; otherwise, communication fails, going back to Step 502.

Further, in Embodiment 6, Step 509 further includes: if the read data is the return value of sending dynamic password, checking whether the state parameter in the return value of sending the dynamic password is the preset value, if yes, the communication terminal is removed and communication is ended, going back to Step 502; otherwise, going to Step 514;

In Embodiment 6, the state parameter specifically is status and the preset value specifically is 0x29.

Correspondingly, Step 515 is replaced with determining whether the confirming character returned from the NFC chip is received in a preset time, if yes, going back to Step 508; otherwise, communication fails, going back to Step 502.

Embodiment 7

Figure 7:
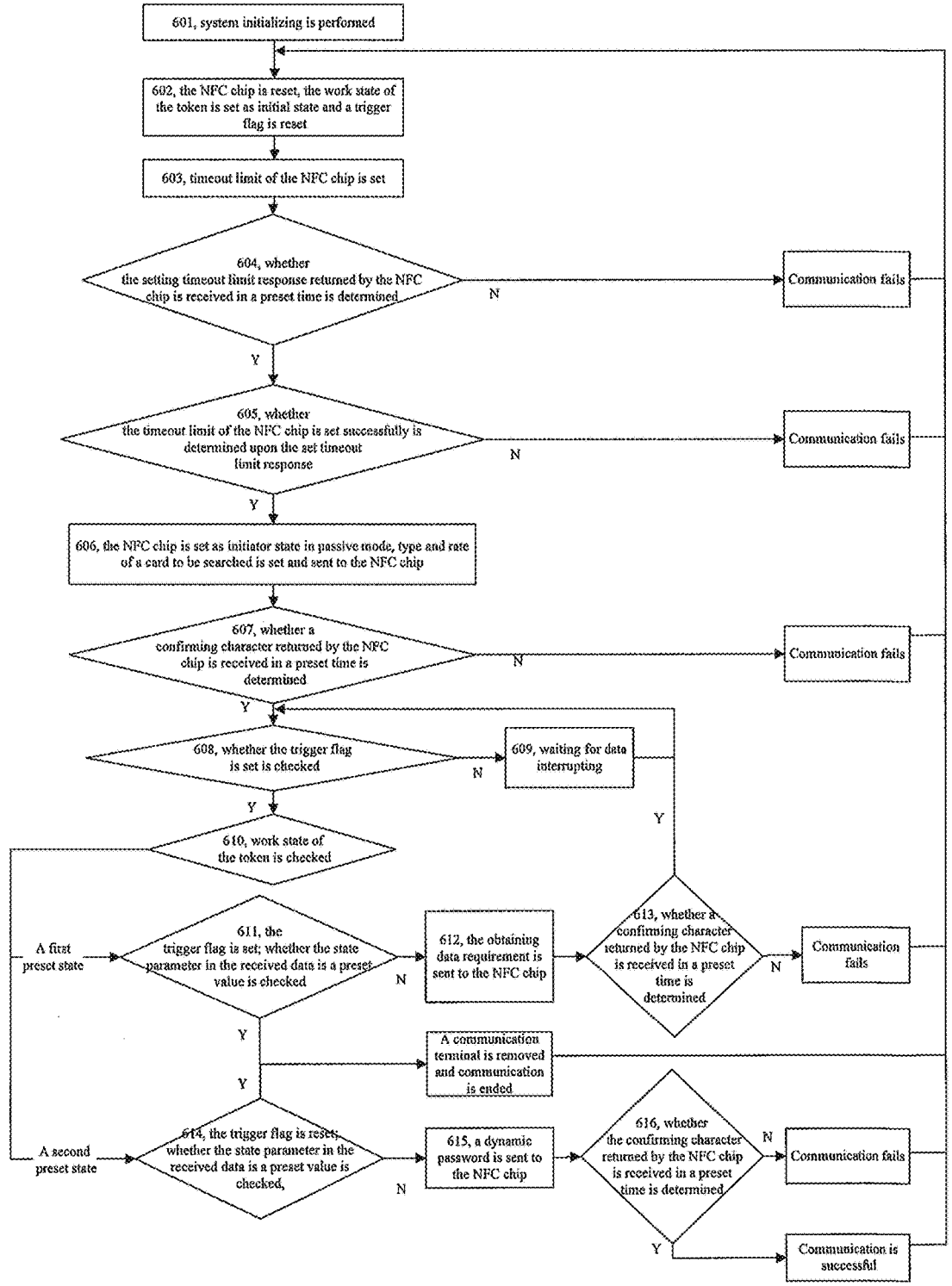
FIG. 7 is a flow diagram of a working method for an NFC token of Embodiment 7 of the present invention.

Embodiment 7 provides a working method for an NFC token, which is as a target device and communicates with an initiator in passive mode. Referring to FIG. 7, the working method of the token specifically includes following steps performed by an MCU of the token.

Step 601, system initializing is performed;

Step 602, the NFC chip is reset, the work state of the token is set as initial state and a trigger flag is reset;

specifically, in Embodiment 7, resetting the NFC chip includes: controlling, by an MCU, its MCU_SPI_RST pin to output low level; after a delayed preset time, controlling its MCU_SPI_RST pin to output high level;

preferably, in Embodiment 7, before Step 602, the method further includes: checking battery power and prompting that battery power is too low when the battery power is lower than a preset battery power; specifically, that battery power is too low is prompted by displaying on a screen and/or changing color of an indicator lamp and/or buzzing and/or voice.

Step 603, timeout limit of the NFC chip is set;

Specifically, in Embodiment 7, setting the timeout limit of the NFC chip includes: sending, by the MCU, a setting timeout limit instruction to the NFC chip, the timeout limit instruction includes power up response timeout limit and communication timeout limit;

Preferably, in Embodiment 7, setting timeout limit instruction is RFConfiguration instruction with Cfqlten parameter of 0x02.

Step 604, whether the setting timeout limit response returned from the NFC chip is received in a preset time is determined, if yes, go to Step 605; otherwise, communication fails and goes back to Step 602;

Step 605, whether the timeout limit of the NFC chip is set successfully is determined upon the set timeout limit response, if yes, go to Step 606; otherwise, communication fails and goes back to Step 602;

Specifically, in Embodiment 7, whether the timeout limit of the NFC chip is set successfully is determined upon the set timeout limit response includes: determining whether the data on the preset byte of the received setting timeout limit response is a preset character string, if yes, setting timeout limit of the NFC chip is successful, otherwise, setting the timeout limit of the NFC chip fails;

Preferably, in Embodiment 7, whether the data on the first three bytes of the received setting timeout limit response is 0x 00 00 FF is determined.

Step 606, the NFC chip is set as initiator state in passive mode, type and rate of a card to be searched is set and sent to the NFC chip;

Specifically, in Embodiment 7, Step 606 includes: initializing a configuration initiator instruction, setting the type and the rate of the card to be searched, setting the card searching parameters in the initiator instruction upon the type and rate of the card to be searched, sending the configuration initiator instruction to the NFC chip;

Preferably, in Embodiment 7, the configuration initiator instruction is InLisPassiveTarget instruction. Step 506 includes: initializing InLisPassiveTarget instruction, setting the type and rate of the card to be searched; setting BrTy parameter of the InLisPassiveTarget instruction upon the type and rate of the card to be searched, sending the InLisPassiveTarget instruction to the NFC chip;

For example, if the set type and rate of the card to be searched are A type card and 106 kbps of ISO/IEC14443 protocol, BrTy parameter of the InLisPassiveTarget instruction is set as 0x00;

if the set type and rate of the card to be searched are FeliCa polling card and 212 kbps, BrTy parameter of the InLisPassiveTarget instruction is set as 0x01;

if the set type and rate of the card to be searched are FeliCa polling card and 424 kbps, BrTy parameter of the InLisPassiveTarget instruction is set as 0x02;

if the set type and rate of the card to be searched are B type card and 106 kbps of ISO/IEC14443-3 protocol, BrTy parameter of the InLisPassiveTarget instruction is set as 0x03;

if the set type and rate of the card to be searched are Innovision Jewel tag card and 106 kbps, BrTy parameter of the InLisPassiveTarget instruction is set as 0x04.

Step 607, whether a confirming character returned from the NFC chip is received in a preset time is determined, if yes, go to Step 608; otherwise, communication fails and goes back to Step 602;

Step 608, whether the trigger flag is set is checked, if yes, go to Step 610; otherwise, go back to Step 609;

Step 609 specifically includes: waiting for data interrupting, going back to Step 608;

In Embodiment 7, when the MCU receives data interruption, reading return data of the NFC chip, checking the read data, if the read data is a return value of setting work mode, state and token parameter of the NFC chip, the work state of the token is updated to a first preset state and the trigger flag is set; if the read data is a return value of an obtaining data requirement, the work state of the token is updated to a second preset state and the trigger flag is set;

In Embodiment 7, setting return value of setting work mode, state and token parameter of the NFC chip specifically is a response of configuring initiator instruction; the return value of the obtaining data requirement specifically is a response of a data exchange instruction;

Preferably, in Embodiment 7, the configuring initiator instruction is InLisPassiveTarget instruction and the data exchange instruction is InDataExchange instruction.

Step 610, work state of the token is checked, go to Step 611 if the work state is a first preset state; go to Step 614 if the work state is the second preset state;

Step 611, the trigger flag is set; whether the state parameter in the received data is a preset value is checked, if yes, a communication terminal is removed and communication is ended, go back to Step 602; otherwise, go to Step 612;

In Embodiment 7, the state parameter is status and the preset value specifically is 0x29.

Step 612, the obtaining data requirement is sent to the NFC chip;

in Embodiment 7, Step 612 specifically includes: generating and sending the data exchange instruction to the NFC chip;

preferably, in Embodiment 7, the data exchange instruction is InDataExchange instruction.

Step 613, whether a confirming character returned from the NFC chip is received in a preset time is determined, if yes, go back to Step 608; otherwise, communication fails and goes back to Step 602;

Step 614, the trigger flag is reset; whether the state parameter in the received data is a preset value is checked, if yes, the communication terminal is removed and communication is ended, go back to Step 602; otherwise, go to Step 615;

In Embodiment 7, the state parameter specifically is status and the preset value specifically is 0x29.

Step 615, a dynamic password is sent to the NFC chip;

in Embodiment 7, Step 615 specifically includes: generating and sending the data exchange instruction containing the dynamic password to the NFC chip;

preferably, in Embodiment 7, the data exchange instruction is InDataExchange instruction.

In Embodiment 7, before Step 615, the method further includes: computing and generating the dynamic password, computing and generating the dynamic password specifically includes: computing and generating the dynamic password upon the key and the event factor preset in the token and updating the event factor; or computing and generating the dynamic password specifically includes: updating the event factor preset in the token and computing and generating the dynamic password upon the key and the event factor preset in the token;

further, in the present Embodiment 7, when the MCU reads the return value of obtaining data requirement returned from the NFC chip, the method further includes obtaining a challenge value from the return value of the obtaining data requirement;

correspondingly, computing and generating the dynamic password specifically includes: computing and generating the dynamic password upon the obtained challenge value, the key and the event factor which are preset in the token, updating the event factor; or, computing and generating the dynamic password specifically includes: updating the event factor preset in the token, computing and generating the dynamic password.

Further, in Embodiment 7, Step 601 further includes: starting timer interrupting, setting interrupting priority of the timer interrupting to be highest;

correspondingly, in Embodiment 7, when the MCU receives the timer interrupting, a timer factor preset in the token is updated;

computing and generating the dynamic password specifically includes: computing and generating the dynamic password upon the key and the time factor which are preset in the token; or, computing and generating the dynamic password includes: computing and generating the dynamic password upon the obtained challenge value, the key and the time factor which are preset in the token; or computing and generating the dynamic password specifically includes computing and generating the dynamic password upon the obtained challenge value, the key and the event factor and the time factor which are preset in the token, and updating the event factor; or computing and generating the dynamic password specifically includes computing and generating the dynamic password upon the obtained challenge value, the key and the event factor and the time factor which are preset in the token, and updating the event factor;

in Embodiment 7, before computing and generating the dynamic password, the method further includes: prompting the user to input confirming generating password information, checking the level of the key interrupting pin, determining whether the level of the key interrupting pin changes to be high level in a preset time; if yes, computing and generating the dynamic password; otherwise, go back to Step 602; or the method includes: prompting the user to input the confirming generating password information, waiting for receiving the key interrupting and determining whether the key interrupting is received in a preset time, if yes, computing and generating the dynamic password; otherwise, go back to Step 602.

In Embodiment 7, before Step 615, the method further includes: prompting the user to input the confirming sending password information, checking the level of the key interrupting pin, determining whether the level of the key interrupting pin changes to be high level in a preset time, if yes, go to Step 615; otherwise, go back to Step 602; or the method includes: prompting the user to input the confirming sending password information, waiting for receiving the key interrupting and determining whether the key interrupting is received in the preset time, if yes, go to Step 615; otherwise, go back to Step 602.

Step 616, whether the confirming character returned from the NFC chip is received in a preset time is determined, if yes, communication is successful, go back to Step 602; otherwise, communication fails, going back to Step 602.

Further, in Embodiment 7, when the MCU receives the data interrupting, the method further includes: if the read data is a return value of sending the dynamic password, setting the trigger flag;

correspondingly, Step 616 is replaced by determining whether a confirming character returned from the NFC chip is received in a preset time, if yes, going back to Step 608; otherwise, communication fails, going back to Step 602.

The described embodiments are only preferred embodiments of the invention and the embodiments are not intended to limit the invention. Any alteration or change easily obtained by those skilled in the art based on the invention should fall in the scope of protection of the invention.

The invention claimed is:

1. A working method for a Near Field Communication (NFC) token, comprising:
    Step 1) performing, by a micro control device for controlling the NFC token, system initializing;
    Step 2) resetting, by the micro control device for controlling the NFC token, a NFC circuit of the NFC token;
    Step 3) sending, by the micro control device for controlling the NFC token, a setting NFC circuit instruction to the NFC circuit;
    Step 4) waiting, by the micro control device for controlling the NFC token, for a return value of the setting NFC circuit instruction returned from the NFC circuit;
    Step 5) sending, by the micro control device for controlling the NFC token, a first preset instruction to the NFC circuit when the micro control device for controlling the NFC token reads the return value of the setting NFC circuit instruction returned from the NFC circuit;

Step 6) waiting, by the micro control device for controlling the NFC token, for a return value on the first preset instruction returned from the NFC circuit; and Step 7) sending, by the micro control device for controlling the NFC token, a second preset instruction containing a dynamic password generated by the NFC token when the micro control device for controlling the NFC token reads a return value of the first preset instruction returned front the NFC circuit;

before sending, by the micro control device for controlling the NFC token, the second preset instruction containing the dynamic password generated by the NFC token; computing and generating, by the micro control device for controlling the NFC token, the dynamic password includes: the micro control device prompts a user to input confirming generating password information, determine whether the confirming generating password information input by the user is received in the first preset time, if yes, compute and generate the dynamic password;

Step 2 further comprises: Step S2') waiting, by the micro control device for controlling the NFC token, for confirming start information input by the user; and performing Step 3 when the confirming start information input by the user is received; otherwise, keep on waiting for the confirming start information input by the user;

Step 1 further comprises initializing, by the micro control device for controlling the NFC token, key interrupting; and Step S2' specifically comprises: starting, by the micro control device for controlling the NFC token, key interrupting, checking a start flag, performing Step 3 when the start flag is set which represents that the confirming start information input by the user is received; while keep on checking the start flag when the start flag is not set which represents that the confirming start information input by the user is not received; and the method further comprises: checking whether the start flap is set when the micro control device for controlling the NFC token receives the key interrupt; if yes, exit the key interrupting, otherwise, set the start flag and exit the key interrupting.

2. The method of claim 1, wherein Step S2' specifically comprises: checking, by the micro control device for controlling the NFC token, level of a key interrupting pin; when the level of the key interrupting pin is high level, representing that the confirming start information input by a user is received and performing Step 3; and when the level of the key interrupting pin is low level, representing that the confirming start information input by a user is not received and it is to keep on checking the level of the key interrupting pin.

3. The method of claim 2, wherein before sending, by the micro control device for controlling the NFC token, the first preset instruction to the NFC circuit and before sending, by the micro control device for controlling the NFC token, the second preset instruction containing the dynamic password generated by the NFC token to the NFC circuit, the method further comprises: checking the level of the key interrupting pin; and keep on performing procedure if the level is high level, while going back to Step 2 if the level is low level.

4. The method of claim 1, wherein Step 1 further comprises initializing, by the micro control device for controlling the NFC token, key interrupt and setting the key interrupting as rising edge triggering;

Step S2' specifically comprises: starting, by the micro control device for controlling the NFC token, key interrupt, checking the start flag, performing Step 3 when the start flag is set which represents that the confirming start information input by the user is received; while keep on checking the start flag when the start flag is not set which represents that the confirming start information input by the user is not received; and the method further comprises: checking whether the start flag is set when the micro control device for controlling the NFC token receives the key interrupt, if yes, exiting key interrupting, otherwise setting the start flag and setting key interrupting as falling edge triggering, then exiting key interrupting.

5. The method of claim 1, wherein Step 3 further comprises: setting, by the micro control device for controlling the NFC token, timeout limit of the NFC circuit.

6. The method of claim 1, wherein Step 3 specifically comprises: setting, by the micro control device for controlling the NFC token, a sequence number of the NFC token, generating an instruction for configuring target device upon the sequence number of the NFC token, sending the instruction for configuring target device to the NFC circuit; and the first preset instruction is an instruction for receiving data, while the second preset instruction is an instruction for sending data.

7. The method of claim 1, wherein, reading, by the micro control device for controlling the NFC token, the return value of the setting the NFC circuit instruction returned from the NFC circuit, before sending the first preset instruction to the NFC circuit, the method further comprises:

sending, by the micro control device for controlling the NFC token, a third preset instruction to the NFC circuit, when the micro control device for controlling the NFC token reads the second preset instruction return value returned from the NFC circuit, and sending the first preset instruction to the NFC circuit.

8. The method of claim 1, wherein Step 3 specifically comprises:

setting, by the micro control device for controlling the NFC token, a card searching type and a card searching rate; generating an instruction for configuring initiator upon the card searching type and the card searching rate, sending the instruction for configuring initiator to the NFC circuit; and the first preset instruction and the second preset instruction are both instruction for exchanging data.

9. The method of claim 1, wherein Step 1 further comprises: initializing data interrupting; Step 4 is specifically replaced with the following steps:

Step A1) waiting, by the micro control device for controlling the NFC token, for receiving data interrupt, performing Step A2) reading, by the micro control device for controlling the NFC token, returned data of the NFC circuit, checking read data, sending the first preset instruction to the NFC circuit if the read data is the setting NFC instruction and go back to Step A1; while sending the second preset instruction containing the dynamic password generated by the NFC token to the NFC circuit if the read data is the return value of the first preset instruction, when the micro control device for controlling the NFC token receives data interrupting.

10. The method of claim 1, wherein Step 1 further comprises: initializing data interrupting;

Step 2 further comprises initializing work state of the NFC token to be initial state;

Step 4 is specifically replaced with the following steps:

Step B1) checking, by the micro control device for controlling the NFC token, a trigger flag, if the trigger flag is not set, waiting for data interrupting and going back to Step B1; if the trigger flag is set, performing Step B2) resetting, by the micro control device for controlling the NFC token, the trigger flag, checking the work state of the NFC token, sending the first preset instruction to the NFC circuit if the work state is the first preset state and going back to Step B1; sending the second preset instruction containing the dynamic password generated by the NFC token to the NFC circuit if the work state is the second preset state; and when the micro control device for controlling the NFC token receives data interrupting, reading return data of the NFC circuit, checking the read data, if the read data is the return value of the NFC circuit, updating the work state of the NFC token as a first preset state and setting the trigger flag; if the read data is the return value of the first preset instruction, updating the work state of the NFC token to be a second preset state and setting the trigger flag.

11. The method of claim 1, wherein Step 1 further comprises: initializing the data interrupting; Step 4 is specifically replaced with the following steps:

Step C1) inquiring, by the micro control device for controlling the NFC token, level of the data interrupting pin, performing Step C2) reading, by the micro control-device for controlling the NFC token, the return data of the NFC circuit, checking the read data, sending the first preset instruction to the NFC circuit if the read data is the return value of the NFC circuit instruction and going back to Step C1; sending the second preset instruction containing the dynamic password generated by the NFC token to the NFC circuit if the read data is the return value of the first preset instruction; if the level of the data interrupting pin is high level.

12. The method of claim 1, wherein before computing and generating the dynamic password, the method further comprises: prompting, by the micro control device for controlling the NFC token, the user to input confirming generating password information, and determining whether the confirming generating dynamic password information input by the user is received in a first preset time, if yes, computing and generating the dynamic password; otherwise, going back to Step 2.

13. The method of claim 1, wherein when the micro control device for controlling the NFC token read the return value of the first preset instruction returned from the NFC circuit, before sending the second preset instruction containing the dynamic password generated by the NFC token to the NFC circuit, the method further comprises: prompting, by the micro control device for controlling the NFC token, the user to input confirming sending password information and determining whether the confirming sending password information input by the user is received in a second preset time, if yes, sending the second preset instruction containing the dynamic password generated by the NFC token to the NFC circuit; otherwise, going back to Step 2.

14. The method of claim 1, wherein computing and generating the dynamic password specifically comprises: computing and generating the dynamic password upon a preset key and an event factor.

15. The method of claim 14, wherein before generating the dynamic password, the method further comprises:

obtaining a challenge value from the return value of the first preset instruction returned from the NFC circuit and displaying the challenge value; and computing and generating the dynamic password specifically comprises: generating the dynamic password upon the challenge value, the preset key and the event factor.

16. The method of claim 15, wherein before computing and generating the dynamic password, the method further comprises:

obtaining the challenge value from the return value of the first preset instruction returned from the NFC circuit and displaying the challenge value; and computing and generating the dynamic password specifically comprises: computing and generating the dynamic password upon the challenge value, the preset key, the event factor and a time factor.

17. The method of claim 16, wherein computing and generating the dynamic password specifically comprises: generating the dynamic password upon the preset key and the time factor.

18. The method of claim 17, wherein before computing and generating the dynamic password, the method further comprises:

obtaining the challenge value from the return value of the first preset instruction returned from the NFC circuit and displaying the challenge value; and computing and generating the dynamic password specifically comprises: computing and generating the dynamic password upon the challenge value, the preset key and the time factor.

19. The method of claim 1, wherein after Step 7 the method further comprises:

waiting, by the micro control device for controlling the NFC token, for the return value of the second preset instruction returned from the NFC circuit, and sending the second preset instruction containing the dynamic password generated by the NFC token to the NFC circuit when the micro control device for controlling the NFC token reads the return value of the second preset instruction returned from the NFC circuit.

20. The method of claim 1, wherein when the micro control device for controlling the NFC token reads the return value of the first preset instruction returned from the NFC circuit, before sending the second preset instruction containing the dynamic password generated by the NFC token to the NFC circuit, the method further comprises:

checking a state parameter in the return value of the first preset instruction, if the state parameter is a preset value, going back to Step 2; and if the state parameter is not the preset value, sending the second preset instruction containing the dynamic password generated by the NFC token to the NFC circuit.

* * * * *